(12) United States Patent
Elshafie et al.

(10) Patent No.: US 11,968,142 B2
(45) Date of Patent: Apr. 23, 2024

(54) TECHNIQUES FOR REFERENCE SIGNAL BUNDLING IN SIDELINK CHANNELS

(71) Applicant: QUALCOMM Incorporated, San Diego, CA (US)

(72) Inventors: Ahmed Elshafie, San Diego, CA (US); Hung Dinh Ly, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 17/405,899

(22) Filed: Aug. 18, 2021

(65) Prior Publication Data

US 2023/0057052 A1    Feb. 23, 2023

(51) Int. Cl.
  *H04L 5/00*  (2006.01)
  *H04L 25/02*  (2006.01)
  *H04W 92/18*  (2009.01)

(52) U.S. Cl.
  CPC ........ *H04L 5/0048* (2013.01); *H04L 25/0202* (2013.01); *H04W 92/18* (2013.01)

(58) Field of Classification Search
  None
  See application file for complete search history.

(56) References Cited

U.S. PATENT DOCUMENTS 11,310,088 B2 *   4/2022   Ly .................. H04L 27/2613
2005/0105656 A1 * 5/2005   Bateman .......... H04L 25/03159
                                                              375/345

(Continued)

FOREIGN PATENT DOCUMENTS

CN     103580794 A   *   2/2014
EP      2200352 B1   *   9/2017   ............ H04W 24/02

(Continued)

OTHER PUBLICATIONS

International Search Report and Written Opinion—PCT/US2022/037117—ISA/EPO—dated Oct. 28, 2022.

(Continued)

*Primary Examiner* — Andrew C Oh
(74) *Attorney, Agent, or Firm* — Holland & Hart LLP

(57) ABSTRACT

Methods, systems, and devices for wireless communication are described, including techniques for utilizing implicit or explicit signaling to indicate a cancellation of demodulation reference signal (DMRS) bundling. A first user equipment (UE) may perform DMRS bundling across physical sidelink channels transmitted to a second UE to enable the second UE to perform joint channel estimation. In some examples, based on a detected change, either at the first UE or the second UE, the first UE may signal to the second UE that the DMRS bundling is canceled. In some examples, the detected change may be a resource allocation change, a physical channel configuration change, a change in a quasi-colocation (QCL) relationship at the first UE, or a change in a transmission configuration indicator (TCI) state at the first UE. Additionally or alternatively, the first UE or the second UE may request the cancellation based on detected changes.

30 Claims, 12 Drawing Sheets

(56) References Cited

U.S. PATENT DOCUMENTS

| | | | |
|---|---|---|---|
| 2008/0152052 A1* | 6/2008 | Thomas | H04L 27/2647 375/346 |
| 2011/0124289 A1* | 5/2011 | Balachandran | H04J 11/0053 455/63.1 |
| 2013/0229931 A1* | 9/2013 | Kim | H04L 5/0053 370/252 |
| 2016/0095080 A1* | 3/2016 | Khoryaev | G01S 5/0284 455/456.1 |
| 2018/0013500 A1* | 1/2018 | Liao | H04W 76/27 |
| 2018/0041906 A1* | 2/2018 | Jang | H04W 16/14 |
| 2018/0167989 A1* | 6/2018 | Yasukawa | H04W 92/18 |
| 2018/0359069 A1* | 12/2018 | Nam | H04B 17/345 |
| 2019/0036738 A1* | 1/2019 | Miao | H04L 25/02 |
| 2019/0165986 A1* | 5/2019 | Saito | H04B 7/0452 |
| 2019/0222380 A1* | 7/2019 | Manolakos | H04L 25/0224 |
| 2020/0213069 A1* | 7/2020 | Jiang | H04L 5/0053 |
| 2020/0337110 A1* | 10/2020 | Kim | H04W 76/28 |
| 2020/0383130 A1* | 12/2020 | Bar-Or Tillinger | H04L 5/0094 |
| 2021/0014095 A1* | 1/2021 | Ly | H04W 72/23 |
| 2021/0029707 A1* | 1/2021 | Xu | H04L 5/0048 |
| 2021/0037525 A1* | 2/2021 | Xu | H04W 72/02 |
| 2021/0105785 A1* | 4/2021 | Manolakos | H04W 72/541 |
| 2021/0184817 A1* | 6/2021 | Nammi | H04L 5/0051 |
| 2021/0273755 A1* | 9/2021 | Shaked | H04L 27/3455 |
| 2021/0297829 A1* | 9/2021 | Kwak | H04W 72/0446 |
| 2021/0409993 A1* | 12/2021 | Fakoorian | H04B 17/24 |
| 2022/0045813 A1* | 2/2022 | Karmoose | H04W 72/1268 |
| 2022/0086782 A1* | 3/2022 | Chen | H04L 5/001 |
| 2022/0248405 A1* | 8/2022 | Ly | H04W 72/0446 |
| 2022/0287040 A1* | 9/2022 | Lee | H04L 5/001 |
| 2022/0408239 A1* | 12/2022 | Takano | H04W 8/183 |
| 2022/0417871 A1* | 12/2022 | Wang | H04J 13/0062 |
| 2023/0008396 A1* | 1/2023 | Wang | H04W 72/232 |
| 2023/0014728 A1* | 1/2023 | Ly | H04L 1/1896 |
| 2023/0044215 A1* | 2/2023 | Wang | H04W 72/20 |
| 2023/0044701 A1* | 2/2023 | Elshafie | H04L 5/0051 |
| 2023/0050382 A1* | 2/2023 | Elshafie | H04L 1/16 |
| 2023/0055114 A1* | 2/2023 | Ryu | H04L 27/2675 |

FOREIGN PATENT DOCUMENTS

| | | | | |
|---|---|---|---|---|
| EP | 3229520 A1 | * | 10/2017 | H04B 7/0456 |
| EP | 3282739 A1 | * | 2/2018 | H04J 11/0023 |
| WO | WO-2011016232 A1 | * | 2/2011 | H04B 7/155 |
| WO | WO-2014165712 A1 | * | 10/2014 | H04W 48/16 |
| WO | WO-2020176895 A1 | * | 9/2020 | H04B 17/309 |

OTHER PUBLICATIONS

Panasonic: "Discussion on PUCCH Enhancement for NR Coverage Enhancement", 3GPP TSG RAN WG1 #106-e, R1-2107118, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021 Aug. 6, 2021, XP052033426, 9 Pages, p. 2.

* cited by examiner

TECHNIQUES FOR REFERENCE SIGNAL BUNDLING IN SIDELINK CHANNELS

FIELD OF TECHNOLOGY

The following relates to wireless communication, including techniques for reference signal bundling in sidelink channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for reference signal bundling in sidelink channels. Generally, the described techniques provide for utilizing signaling, such as implicit or explicit signaling, to indicate a cancellation of reference signal bundling, such as demodulation reference signal (DMRS) bundling. For example, a first user equipment (UE) may perform channel estimation, such as joint channel estimation, of one or more physical channels during a bundling window, where the first UE may utilize reference signals from multiple transmissions from a second UE to estimate the one or more physical channels. In some cases, the first UE may use reference signal bundling to estimate a physical sidelink channel (e.g., a physical sidelink shared channel (PSSCH), a physical sidelink feedback channel (PSFCH)) based on a reference signal included in a previous physical sidelink channel. In some examples, based on a detected change in channel parameters either at the first UE, the second UE, or both, the second UE may signal to the first UE that the reference signal bundling is canceled (e.g., phase continuity may be lost). In some examples, the detected change may be a resource allocation change (e.g., a change in resource block (RB) usage), a physical channel configuration change, a change in a quasi-colocation (QCL) relationship, a change in a transmission configuration indicator (TCI) state, or any combination thereof. Additionally or alternatively, the first UE may request the cancellation based on detected changes.

A method for wireless communication at a first user equipment (UE) is described. The method may include transmitting, to a second UE, first control signaling indicating a joint channel estimation procedure for a sidelink connection based on a set of reference signals from the second UE, determining a change in one or more channel parameters of the sidelink connection after the first control signaling is transmitted, transmitting, to the second UE, second control signaling indicating a cancellation of the joint channel estimation procedure for the sidelink connection based on determining the change in the one or more channel parameters, and transmitting one or more reference signals of the set of reference signals based on receiving the second control signaling, at least one reference signal associated with a channel estimation procedure for the sidelink connection.

An apparatus for wireless communication at a first UE is described. The apparatus may include a processor, memory coupled with the processor, and instructions stored in the memory. The instructions may be executable by the processor to cause the apparatus to transmit, to a second UE, first control signaling indicating a joint channel estimation procedure for a sidelink connection based on a set of reference signals from the second UE, determine a change in one or more channel parameters of the sidelink connection after the first control signaling is transmitted, transmit, to the second UE, second control signaling indicating a cancellation of the joint channel estimation procedure for the sidelink connection based on determining the change in the one or more channel parameters, and transmit one or more reference signals of the set of reference signals based on receiving the second control signaling, at least one reference signal associated with a channel estimation procedure for the sidelink connection.

Another apparatus for wireless communication at a first UE is described. The apparatus may include means for transmitting, to a second UE, first control signaling indicating a joint channel estimation procedure for a sidelink connection based on a set of reference signals from the second UE, means for determining a change in one or more channel parameters of the sidelink connection after the first control signaling is transmitted, means for transmitting, to the second UE, second control signaling indicating a cancellation of the joint channel estimation procedure for the sidelink connection based on determining the change in the one or more channel parameters, and means for transmitting one or more reference signals of the set of reference signals based on receiving the second control signaling, at least one reference signal associated with a channel estimation procedure for the sidelink connection.

A non-transitory computer-readable medium storing code for wireless communication at a first UE is described. The code may include instructions executable by a processor to transmit, to a second UE, first control signaling indicating a joint channel estimation procedure for a sidelink connection based on a set of reference signals from the second UE, determine a change in one or more channel parameters of the sidelink connection after the first control signaling is transmitted, transmit, to the second UE, second control signaling indicating a cancellation of the joint channel estimation procedure for the sidelink connection based on determining the change in the one or more channel parameters, and transmit one or more reference signals of the set of reference signals based on receiving the second control signaling, at least one reference signal associated with a channel estimation procedure for the sidelink connection.

In some examples of the method, apparatuses, and non-transitory computer-readable medium described herein, transmitting the second control signaling may include operations, features, means, or instructions for transmitting, in the second control signaling, an indication of a resource allocation associated with the set of reference signals, where the change in the one or more channel parameters includes the resource allocation, and where the cancellation of the joint channel estimation procedure for the sidelink connection may be based on the resource allocation.

In some examples of the method, apparatuses, and non-transitory computer-readable medium described herein, transmitting the second control signaling may include operations, features, means, or instructions for transmitting, in the second control signaling, an indication of one or more resource blocks allocated for a sidelink feedback channel, where the change in the one or more channel parameters includes the one or more resource blocks allocated for the sidelink feedback channel, and where the cancellation of the joint channel estimation procedure for the sidelink connection may be based on the one or more resource blocks.

In some examples of the method, apparatuses, and non-transitory computer-readable medium described herein, a resource allocation associated with one or more reference signals of the set of reference signals may be based on a mapping of the one or more resource blocks allocated for the sidelink feedback channel.

In some examples of the method, apparatuses, and non-transitory computer-readable medium described herein, transmitting the second control signaling may include operations, features, means, or instructions for transmitting, in the second control signaling, an indication of a quasi-colocation relationship at the first UE, where the cancellation of the joint channel estimation procedure for the sidelink connection may be based on the quasi-colocation parameter.

In some examples of the method, apparatuses, and non-transitory computer-readable medium described herein, the indication of the quasi-colocation relationship may be a last indication of a set of indications of the quasi-colocation relationship.

In some examples of the method, apparatuses, and non-transitory computer-readable medium described herein, the quasi-colocation relationship may be different from a previous quasi-colocation relationship, and the change in the one or more channel parameters includes a change from the previous quasi-colocation relationship to the quasi-colocation relationship.

In some examples of the method, apparatuses, and non-transitory computer-readable medium described herein, the change in the one or more channel parameters includes the quasi-colocation relationship.

In some examples of the method, apparatuses, and non-transitory computer-readable medium described herein, transmitting the second control signaling may include operations, features, means, or instructions for transmitting, in the second control signaling, an indication of a transmission configuration indicator state for the first UE, where the cancellation of the joint channel estimation procedure for the sidelink connection may be based on the transmission configuration indicator state.

In some examples of the method, apparatuses, and non-transitory computer-readable medium described herein, the indication of the transmission configuration indicator state may be a last indication of a set of indications of the transmission configuration indicator state for the first UE.

In some examples of the method, apparatuses, and non-transitory computer-readable medium described herein, the transmission configuration indicator state may be different from a previous transmission configuration indicator state, and the change in the one or more channel parameters includes a change from the previous transmission configuration indicator state to the transmission configuration indicator state.

In some examples of the method, apparatuses, and non-transitory computer-readable medium described herein, the change in the one or more channel parameters includes the transmission configuration indicator state.

In some examples of the method, apparatuses, and non-transitory computer-readable medium described herein, transmitting the second control signaling may include operations, features, means, or instructions for transmitting, in the second control signaling, an indication of a phase coherency identifier, a continuity identifier, or both, associated with the set of reference signals, where the cancellation of the joint channel estimation procedure for the sidelink connection may be based on the phase coherency identifier, the continuity identifier, or both.

Some examples of the method, apparatuses, and non-transitory computer-readable medium described herein may further include operations, features, means, or instructions for receiving, from the second UE, signaling indicating a request to cancel the first joint channel estimation procedure, where the change in the one or more channel parameters may be determined based on receiving the signaling.

Some examples of the method, apparatuses, and non-transitory computer-readable medium described herein may further include operations, features, means, or instructions for identifying one or more coherency process identifiers in the signaling, each coherency process identifier associated with a respective reference signal of the set of reference signals and identifying the request to cancel the joint channel estimation procedure based on identifying the one or more coherency process identifiers.

Some examples of the method, apparatuses, and non-transitory computer-readable medium described herein may further include operations, features, means, or instructions for deactivating a power amplifier at the first UE based on transmitting the second control signaling.

In some examples of the method, apparatuses, and non-transitory computer-readable medium described herein, transmitting the second control signaling may include operations, features, means, or instructions for transmitting, in the second control signaling, an indication of one or more coherency process identifiers, each coherency process identifier associated with a respective reference signal of the set of reference signals, where the cancellation of the joint channel estimation procedure for the sidelink connection may be based on the one or more coherency process identifiers.

In some examples of the method, apparatuses, and non-transitory computer-readable medium described herein, the first control signaling includes a first radio resource control message, a first medium access control control element, a first sidelink control information message, or any combination thereof and the second control signaling includes a second radio resource control message, a second medium access control control element, a second sidelink control information message, or any combination thereof.

A method for wireless communication at a first UE is described. The method may include receiving, from a second UE, first control signaling indicating a joint channel estimation procedure for a sidelink connection based on a set of reference signals from the second UE, receiving, from the second UE, second control signaling indicating a cancellation of the joint channel estimation procedure for the sidelink connection based on a change in one or more channel parameters, monitoring for one or more reference signals of the set of reference signals based on transmitting the second control signaling, and performing a channel estimation procedure for the sidelink connection using at least one reference signal received based on monitoring for the one or more reference signals.

An apparatus for wireless communication at a first UE is described. The apparatus may include a processor, memory coupled with the processor, and instructions stored in the memory. The instructions may be executable by the processor to cause the apparatus to receive, from a second UE, first control signaling indicating a joint channel estimation procedure for a sidelink connection based on a set of reference signals from the second UE, receive, from the second UE, second control signaling indicating a cancellation of the joint channel estimation procedure for the sidelink connection based on a change in one or more channel parameters, monitor for one or more reference signals of the set of reference signals based on transmitting the second control signaling, and perform a channel estimation procedure for the sidelink connection using at least one reference signal received based on monitoring for the one or more reference signals.

Another apparatus for wireless communication at a first UE is described. The apparatus may include means for receiving, from a second UE, first control signaling indicating a joint channel estimation procedure for a sidelink connection based on a set of reference signals from the second UE, means for receiving, from the second UE, second control signaling indicating a cancellation of the joint channel estimation procedure for the sidelink connection based on a change in one or more channel parameters, means for monitoring for one or more reference signals of the set of reference signals based on transmitting the second control signaling, and means for performing a channel estimation procedure for the sidelink connection using at least one reference signal received based on monitoring for the one or more reference signals.

A non-transitory computer-readable medium storing code for wireless communication at a first UE is described. The code may include instructions executable by a processor to receive, from a second UE, first control signaling indicating a joint channel estimation procedure for a sidelink connection based on a set of reference signals from the second UE, receive, from the second UE, second control signaling indicating a cancellation of the joint channel estimation procedure for the sidelink connection based on a change in one or more channel parameters, monitor for one or more reference signals of the set of reference signals based on transmitting the second control signaling, and perform a channel estimation procedure for the sidelink connection using at least one reference signal received based on monitoring for the one or more reference signals.

Some examples of the method, apparatuses, and non-transitory computer-readable medium described herein may further include operations, features, means, or instructions for identifying, in the second control signaling, an indication of a resource allocation associated with the set of reference signals, where the change in the one or more channel parameters includes the resource allocation, and where the cancellation of the joint channel estimation procedure for the sidelink connection may be indicated based on the resource allocation.

Some examples of the method, apparatuses, and non-transitory computer-readable medium described herein may further include operations, features, means, or instructions for identifying, in the second control signaling, an indication of one or more resource blocks allocated for a sidelink feedback channel, where the change in the one or more channel parameters includes the one or more resource blocks allocated for the sidelink feedback channel, and where the cancellation of the joint channel estimation procedure for the sidelink connection may be indicated based on the one or more resource blocks.

In some examples of the method, apparatuses, and non-transitory computer-readable medium described herein, a resource allocation associated with one or more reference signals of the set of reference signals may be based on a mapping of the one or more resource blocks allocated for the sidelink feedback channel.

Some examples of the method, apparatuses, and non-transitory computer-readable medium described herein may further include operations, features, means, or instructions for identifying, in the second control signaling, an indication of a quasi-colocation relationship at the second UE, where the cancellation of the joint channel estimation procedure for the sidelink connection may be indicated based on the quasi-colocation parameter.

In some examples of the method, apparatuses, and non-transitory computer-readable medium described herein, the indication of the quasi-colocation relationship may be a last indication of a set of indications of the quasi-colocation relationship.

In some examples of the method, apparatuses, and non-transitory computer-readable medium described herein, the quasi-colocation relationship may be different from a previous quasi-colocation relationship, and the change in the one or more channel parameters includes a change from the previous quasi-colocation relationship to the quasi-colocation relationship.

In some examples of the method, apparatuses, and non-transitory computer-readable medium described herein, the change in the one or more channel parameters includes the quasi-colocation relationship.

Some examples of the method, apparatuses, and non-transitory computer-readable medium described herein may further include operations, features, means, or instructions for identifying, in the second control signaling, an indication of a transmission configuration indicator state for the second UE, where the cancellation of the joint channel estimation procedure for the sidelink connection may be indicated based on the transmission configuration indicator state.

In some examples of the method, apparatuses, and non-transitory computer-readable medium described herein, the indication of the transmission configuration indicator state may be a last indication of a set of indications of the transmission configuration indicator state for the second UE.

In some examples of the method, apparatuses, and non-transitory computer-readable medium described herein, the transmission configuration indicator state may be different from a previous transmission configuration indicator state, and the change in the one or more channel parameters includes a change from the previous transmission configuration indicator state to the transmission configuration indicator state.

In some examples of the method, apparatuses, and non-transitory computer-readable medium described herein, the change in the one or more channel parameters includes the transmission configuration indicator state.

Some examples of the method, apparatuses, and non-transitory computer-readable medium described herein may further include operations, features, means, or instructions for identifying, in the second control signaling, an indication of a phase coherency identifier, a continuity identifier, or both, associated with the set of reference signals, where the cancellation of the joint channel estimation procedure for the sidelink connection may be indicated based on the phase coherency identifier, the continuity identifier, or both.

Some examples of the method, apparatuses, and non-transitory computer-readable medium described herein may further include operations, features, means, or instructions for transmitting, to the second UE, signaling indicating a request to cancel the first joint channel estimation procedure, where the change in the one or more channel parameters may be based on transmitting the signaling.

In some examples of the method, apparatuses, and non-transitory computer-readable medium described herein, transmitting the signaling may include operations, features, means, or instructions for transmitting, in the signaling, one or more coherency process identifiers, each coherency process identifier associated with a respective reference signal of the set of reference signals, where the request to cancel the joint channel estimation procedure may be indicated based on the one or more coherency process identifiers.

Some examples of the method, apparatuses, and non-transitory computer-readable medium described herein may further include operations, features, means, or instructions for identifying, in the second control signaling, an indication of one or more coherency process identifiers, each coherency process identifier associated with a respective reference signal of the set of reference signals, where the cancellation of the joint channel estimation procedure for the sidelink connection may be indicated based on the one or more coherency process identifiers.

In some examples of the method, apparatuses, and non-transitory computer-readable medium described herein, the first control signaling includes a first radio resource control message, a first medium access control control element, a first sidelink control information message, or any combination thereof and the second control signaling includes a second radio resource control message, a second medium access control control element, a second sidelink control information message, or any combination thereof.

DETAILED DESCRIPTION

A first user equipment (UE) and a second UE may perform reference signal (e.g., demodulation reference signal (DMRS)) bundling for joint channel estimation on sidelink channels (e.g., a physical sidelink control channel (PSSCH), a physical sidelink feedback channel (PSFCH), or a physical sidelink control channel (PSCCH), or any combination thereof) in a bundling window. The first UE and the second UE may maintain phase coherency across sidelink transmissions to improve signaling reliability (e.g., utilizing phase coherency across allocated resources to perform joint channel estimation using reference signals in different sidelink transmissions). Although the techniques herein are described with reference to DMRS and related bundling, it is to be understood that these techniques apply to bundling of any reference signal in sidelink channels, such as a phase tracking reference signal (PTRS), a channel state information reference signal (CSI-RS), or a sounding reference signal (SRS), among other examples.

In some cases, if phase continuity between two UEs is lost during an indicated DMRS bundling window, the two UEs may continue to attempt DMRS bundling over one or more resources, which may result in inaccurate channel estimation, additional signaling overhead to attempt to reestablish phase continuity, and an overall decrease in network efficiency. Additionally, indications corresponding to DMRS bundling cancellation may present timing challenges that may result in further network inefficiencies, such as latency or delayed channel estimation.

The techniques described herein may enable indicating a cancellation of DMRS bundling during a DMRS bundling window corresponding to one or more sidelink physical channels. In some examples, after indicating a window of DMRS bundling, a DMRS bundle may be canceled if a resource allocation is altered. Additionally or alternatively, a change in quasi-co location (QCL) may indicate DMRS bundling cancellation during a DMRS bundling window. Additionally or alternatively, explicit signaling may be implemented to indicate a cancellation of DMRS bundling over different channels. For example, a phase continuity identifier may be used to point to a cancellation of a bundling process. In some cases, a first UE may request that a second UE cancel DMRS bundling for sidelink transmissions from the second UE, where the indication may be included in one or more sidelink control information (SCI) messages.

Aspects of the disclosure are initially described in the context of wireless communications systems. Aspects of the disclosure are further illustrated by a transmission scheme and a process flow. Aspects of the disclosure are further illustrated by and described with reference to apparatus diagrams, system diagrams, and flowcharts that relate to techniques for reference signal bundling in sidelink channels.

Figure 1:
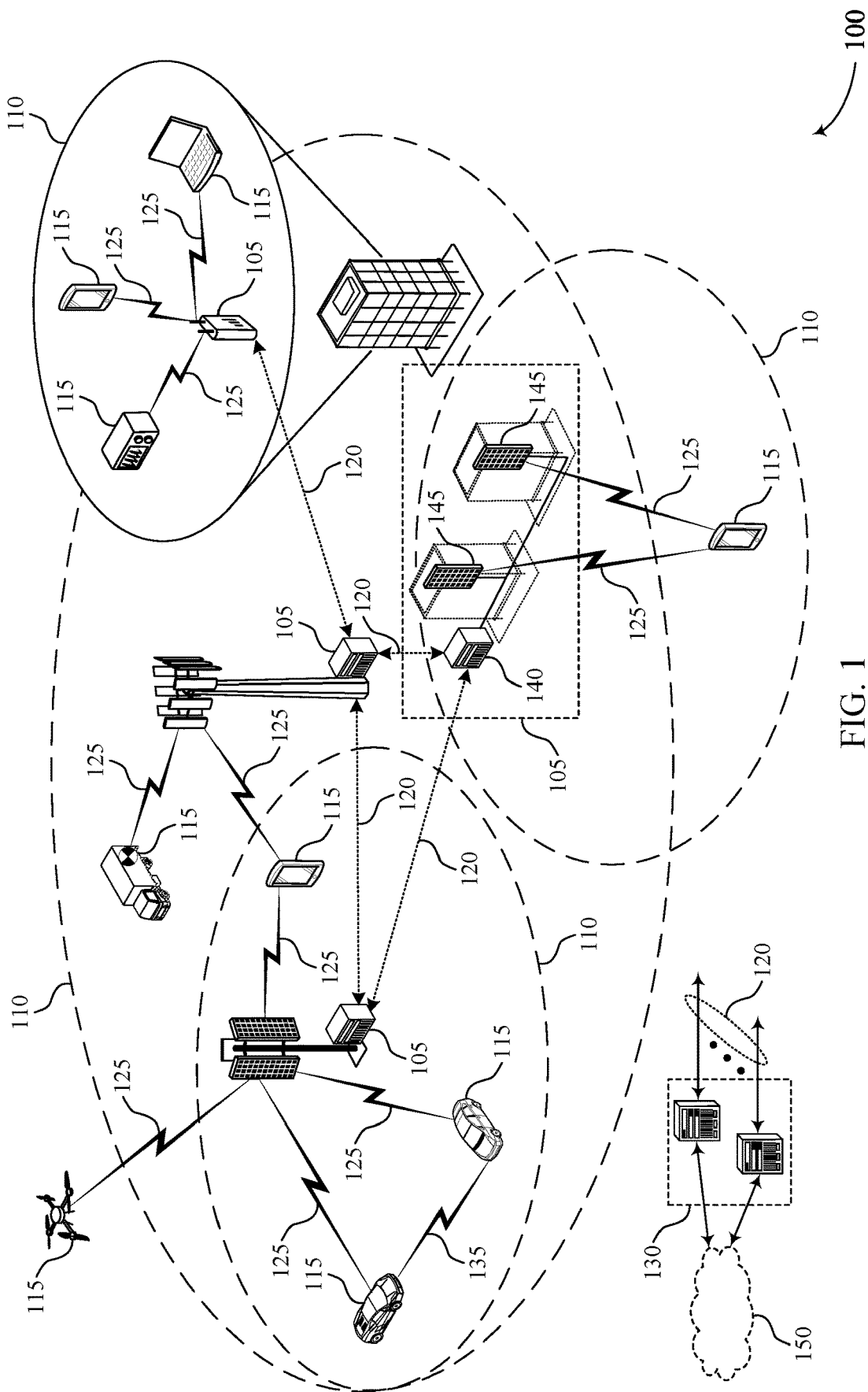
FIG. 1 illustrates an example of a wireless communications system that supports techniques for reference signal bundling in sidelink channels in accordance with aspects of the present disclosure.

FIG. 1 illustrates an example of a wireless communications system 100 that supports techniques for reference signal bundling in sidelink channels in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, an industrial IoT (IIOT) or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

One or more wireless devices may use DMRS bundling to perform joint channel estimation over one or more physical channels. For example, a UE 115 may perform uplink DMRS bundling with the base station 105 to enable the base station 105 to estimate an uplink channel of a connection on a communications link 125, which may be referred to as a Uu interface. To perform uplink DMRS bundling, the transmitter (e.g., the UE 115) may maintain one or more parameters corresponding to uplink transmissions such that the base station 105 may perform joint channel estimation across multiple uplink transmissions. For example, the UE 115 may maintain phase continuity across the multiple uplink transmissions by maintaining a same frequency resource allocation for the multiple uplink transmissions, maintaining a same transmit power, maintaining a same spatial transmission relation, antenna ports, and precoding, or any combination thereof. The receiver (e.g., the base station 105) may process DMRS from multiple uplink transmissions (e.g., over physical uplink shared channel (PUSCH) or physical uplink control channel (PUCCH) transmissions) for joint channel estimation by leveraging phase continuity, among other transmission parameters, at the UE 115.

In some examples, a first UE 115 may communicate with a second UE 115 over a sidelink connection (e.g., a D2D communication link 135). Sidelink communications may generally correspond to direct communications between UEs 115. Sidelink communications may include two resource allocation modes. In a first mode, which may be referred to as Mode 1 or a centralized mode, resource allocations for the sidelink communications may be determined by the base station 105. In a second mode, which may be referred to as Mode 2 or a distributed mode, resource allocations may be determined autonomously by a UE 115 (e.g., the first UE 115).

In some cases, such as in Mode 2 communications in V2X, maintaining phase coherency across sidelink transmissions may improve reliability (e.g., by enabling DMRS bundling and joint channel estimation, which may reduce occurrences of inaccurate channel estimation). For example, to support IIOT, URLLC, or both in sidelink where reliability may be prioritized, phase continuity may provide signal reliability boosts by enabling DMRS bundling between UEs 115. However, if phase continuity degrades or is lost before or during the DMRS bundling window, inaccurate channel estimation may be avoided by preemptively cancelling DMRS bundling, which may reduce occurrences of inaccurate channel estimation. It may be beneficial to efficiently activate and cancel DMRS bundling in sidelink communications, which may result in further increased signal reliability.

In some examples, a spatial relationship may be utilized to determine whether to initiate or cancel a DMRS bundling window on a Uu interface or a sidelink connection. For example, sidelink QCL corresponding to the first UE 115 and the second UE 115 may be utilized for channel estimation. QCL between multiple reference signal antenna ports may be introduced to help the first UE 115 with channel estimation, frequency offset estimation, and synchronization. For example, if two antenna ports have a QCL relationship in terms of delay spread, then the first UE 115 may determine the delay spread from one port and apply the results for the other antenna port. In some examples, four different QCL cases may be defined. Case A may correspond to a Doppler shift, a Doppler spread, an average delay, and a delay spread. Case B may correspond to a Doppler shift and a Doppler spread. Case C may correspond to a Doppler shift and an average delay, and Case D may correspond to spatial receiver parameters.

In some instances, QCL may be used to support reception of downlink transmissions, such as physical downlink shared channel (PDSCH), physical downlink control channel (PDCCH), and CSI-RS transmissions. The base station 105 may indicate antenna ports used for synchronization signal block (SSB) or CSI-RS transmissions have a QCL relationship with antenna ports of the downlink transmissions. In some examples, QCL and transmission configuration indicator (TCI) states may enhance one or more aspects of wireless communications. For example, each TCI state may include parameters for configuring a QCL relationship between downlink reference signals and DMRS ports of the PDSCH, DMRS ports of the PDCCH, CSI-RS ports of a CSI-RS resource, or any combination thereof. In some examples, the downlink reference signals may correspond to SSB or CSI-RS. In some cases, TCI may be configured via a control message (e.g., RRC). For example, an RRC configuration may specify up to 128 TCI states for PDSCH and up to 64 states for physical downlink control channel (PDCCH). A MAC-CE, a downlink control information (DCI) message, or both, may inform the UE 115 of an active TCI state. In some examples, two QCL relationships may be configured for each TCI state (e.g., Qcl-Case1 may be configured for a first downlink reference signal, and Qcl-Case2 may be configured for a second downlink reference signal).

In some cases, QCL may also be leveraged in sidelink communications. The first UE 115 may indicate QCL information to the second UE 115. In such cases, two modes of operations may be considered. In a first mode, QCL information may be based on TCI states. For example, one or more TCI states may be configured for the second UE 115, where the first UE 115 may indicate a TCI state to the second UE 115. The second UE 115 may retrieve a corresponding channel profile (e.g., large scale channel properties) based on the TCI state. In a second mode, QCL information may be based on a QCL change indication. The UE 115 may indicate whether QCL has been changed between two consecutive transmissions or not. For example, if the QCL change indication is indicated via an SCI message (e.g., SCI-2), the SCI message may include 1 bit to indicate one of two QCL states; the second UE 115 may determine whether a QCL has been changed by comparing the QCL indicated in multiple SCI messages. In other words, if the QCL change indication is toggled or changed (e.g., from 0 to 1 or from 1 to 0), then the second UE 115 may determine that the QCL state has been changed from previous transmission (e.g., one or more transmissions). In some cases, the second UE 115 may re-obtain second order channel statistics. In some examples, a QCL change indication may be similar to a new data indicator (NDI) mechanism for HARQ transmissions and retransmissions.

Increased latencies in sidelink may have increased effects in sidelink communications utilizing high signal reliability (e.g., V2X, URLLC, IIOT). For example, the first UE 115 and the second UE 115 may utilize a DMRS bundling window to perform joint channel estimation over physical sidelink channels (e.g., by leveraging phase continuity). In some cases, such as if phase continuity is lost, the DMRS bundling window may be canceled. However, cancelling the DMRS bundling window may be associated with one or more messaging techniques described above (e.g., QCL change indication), which may be further associated with increased latencies.

According to the techniques described herein, the second UE 115 may perform DMRS bundling across physical sidelink channels transmitted to the first UE 115 to enable the first UE 115 to perform joint channel estimation. In some examples, based on a detected change, either at the first UE 115 or the second UE 115, the second UE 115 may signal the first UE 115 that the DMRS bundling is canceled. In some examples, the detected change may be a resource allocation change, a physical channel configuration change, a change in a QCL relationship, or a change in a TCI state. Additionally or alternatively, the first UE 115 or the second UE 115 may request the cancellation based on detected changes.

Figure 2:
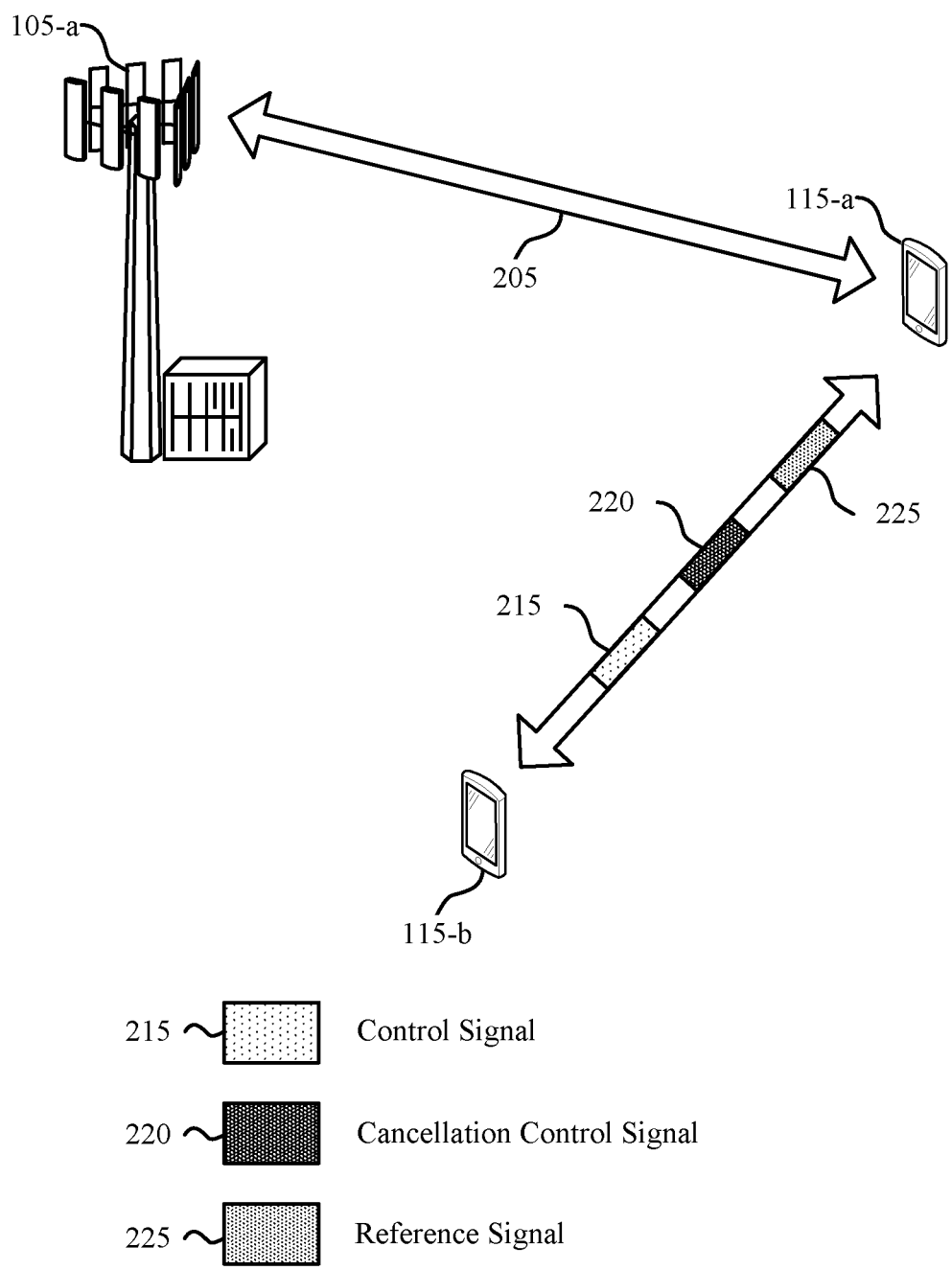
FIG. 2 illustrates an example of a wireless communications system that supports techniques for reference signal bundling in sidelink channels in accordance with aspects of the present disclosure.

FIG. 2 illustrates an example of a wireless communications system 200 that supports techniques for reference signal bundling in sidelink channels in accordance with aspects of the present disclosure. The wireless communications system 200 may implement or be implemented by one or more aspects of the wireless communications system 100. For example, the wireless communications system 200 may include a UE 115-a, a UE 115-b, and a base station 105-a, which may be examples of corresponding devices described with reference to FIG. 1. It should be noted that, while examples are discussed below, any number of devices and device types may be used to accomplish implementations described in the present disclosure. For example, the UE 115-*a* and the UE 115-*b* may correspond to vehicles in a V2X system. Additionally, the described techniques may apply to one or more types of communications, such as URLLC, IIOT, and the like.

The base station 105-*a* and the UE 115-*a* may communicate over a communication link 205, which may be an example of a Uu interface. Similarly, the UE 115-*a* and the UE 115-*b* may communicate via one or more sidelink connections (which may be an example of a PC5 interface) in physical sidelink channels (e.g., PSSCH, PSFCH, PSCCH, or a combination thereof). In some cases, such as those described in the present disclosure, the UE 115-*a* and the UE 115-*b* may perform DMRS bundling for joint channel estimation of the sidelink connection using DMRS in one or more sidelink transmissions from the UE 115-*a*. That is, the UE 115-*b* may use DMRS from multiple sidelink transmissions (e.g., corresponding to multiple TTIs) to estimate the sidelink channel.

In some cases, the UE 115-*a* may use reference signals 225 (e.g., DMRS) from sidelink transmissions in a DMRS bundling window, where the DMRS bundling window may correspond to a timeframe in which the UE 115-*a* receives DMRS in multiple transmissions and jointly processes the received DMRS to estimate a sidelink channel. For example, the UE 115-*b* may transmit a control signal 215 to the UE 115-*a* indicating a joint channel estimation procedure (e.g., using DMRS bundling). In some cases, the control signal 215 may be a MAC-CE, an SCI message, an RRC message, or any combination thereof. In some examples, the control signal 215 may indicate a DMRS bundling window, where the UE 115-*b* may perform DMRS bundling to enable joint channel estimation over one or more resources as indicated in the control signal 215. Additionally or alternatively, the UE 115-*a* may leverage continuity of one or more parameters of transmissions from the UE 115-*b* to enable DMRS bundling, such as phase continuity. In some cases, however, one or more aspects of the sidelink channel may degrade such that DMRS bundling may no longer be viable. For example, after transmitting an indication of a DMRS bundling window in the control signal 215, the UE 115-*b* may determine a loss of phase continuity over the sidelink channel. Based on the determination, the UE 115-*b* may transmit a cancellation control signal 220 to the UE 115-*a* indicating a cancellation of DMRS bundling corresponding to the DMRS bundling window. In some examples, the cancellation control signal 220 may be a second RRC message, a second MAC-CE message, a second SCI message, or any combination thereof.

In some cases, the cancellation control signal 220 may include an implicit cancellation. For example, UE 115-*a* may identify the cancellation of DMRS bundling based on a change in time allocations, frequency allocations, or both, in the cancellation control signal 220 (e.g., in an SCI message such as SCI-1, which includes information pertaining to resource allocations). For example, resource changes for physical sidelink channels may correspond to an indication of DMRS bundling cancellation, a loss of phase continuity, or both. Thus, based on decoding an SCI-1, the UE 115-*a* may determine if a transmission is DMRS bundled or not.

In some cases, the DMRS bundling cancellation may apply to feedback from the UE 115-*a*, such as in PSFCH transmissions. For example, the cancellation control signal 220 may indicate a change in resource block (RB) allocations. If the RBs allocated for the PSFCH change, the UE 115-*a* may determine DMRS bundling for the PSFCH is canceled (e.g., no phase continuity is expected for reference signals 225 transmitted in the PSFCH). Additionally or alternatively, the change in RB allocations may configure transmission of a reference signal 225 based on a mapping of one or more RBs allocated for the PSFCH. For example, a mapping between a PSSCH resource allocation and a PSFCH resource allocation may enable signaled changes in PSSCH resources (e.g., time slot and sub-channel allocations) to indicate a cancellation of PSFCH DMRS bundling.

In other examples, changes in QCL may indicate DMRS bundling cancellation. For example, the cancellation control signal 220 may indicate a QCL change. In other words, the QCL relationship indicated in the cancellation control signal 220 may be different than a previously indicated QCL relationship. In some cases, a change in one or more channel parameters may correspond to a change in the QCL relationship. For example, the UE 115-*b* may indicate, to the UE 115-*a*, a change in QCL from a previously indicated QCL based on one or more channel parameters (e.g., phase continuity). Based on the change indicated in the cancellation control signal 220, the UE 115-*a* may determine that DMRS bundling may be canceled. Similarly, for PSFCH, the UE 115-*a* may indicate a QCL change to the UE 115-*b*. Similarly, a change in TCI state information may indicate a DMRS bundling cancellation. For example, the UE 115-*b* may indicate a TCI state in the cancellation control signal 220 that is different from a previously received TCI state. Based on the change in TCI states, the UE 115-*a* may determine DMRS bundling is canceled.

In some examples, a last QCL indication, among a set of indications occurring between two physical sidelink channel transmissions, may determine whether DMRS bundling is canceled or not. For example, the last QCL indication within a communication slot may be used by the UE 115-*a*, the UE 115-*b*, or both, to determine if DMRS bundling is canceled. In some other examples, if the last indicated QCL (e.g., or TCI state) is different from a previously bundled QCL (e.g., or a last indicated TCI state), then the DMRS bundling may be canceled. In some other examples, DMRS bundling may be canceled by an explicit indication, an explicit request, or both. Examples of explicit cancellation, as well as explicit requests for cancellation, are discussed in more detail with reference to FIG. 3. Based on an indicated cancellation of DMRS bundling in the cancellation control signal 220, the UE 115-*b* may transmit a reference signal 225 to the UE 115-*a*. The UE 115-*a* may perform channel estimation based on the reference signal 225 (e.g., without DMRS bundling).

Although the techniques are described herein with reference to the UE 115-*a* performing channel estimation based on the UE 115-*b* canceling DMRS bundling for reference signals 225 transmitted from the UE 115-*b* to the UE 115-*a*, these techniques may also apply to any UEs 115 communicating over a sidelink connection. For example, the UE 115-*b* may perform channel estimation using reference signals 225 transmitted from the UE 115-*a* to the UE 115-*b* based on the UE 115-*a* transmitting a cancellation control signal 220 indicating a DMRS bundling cancellation.

Figure 3:
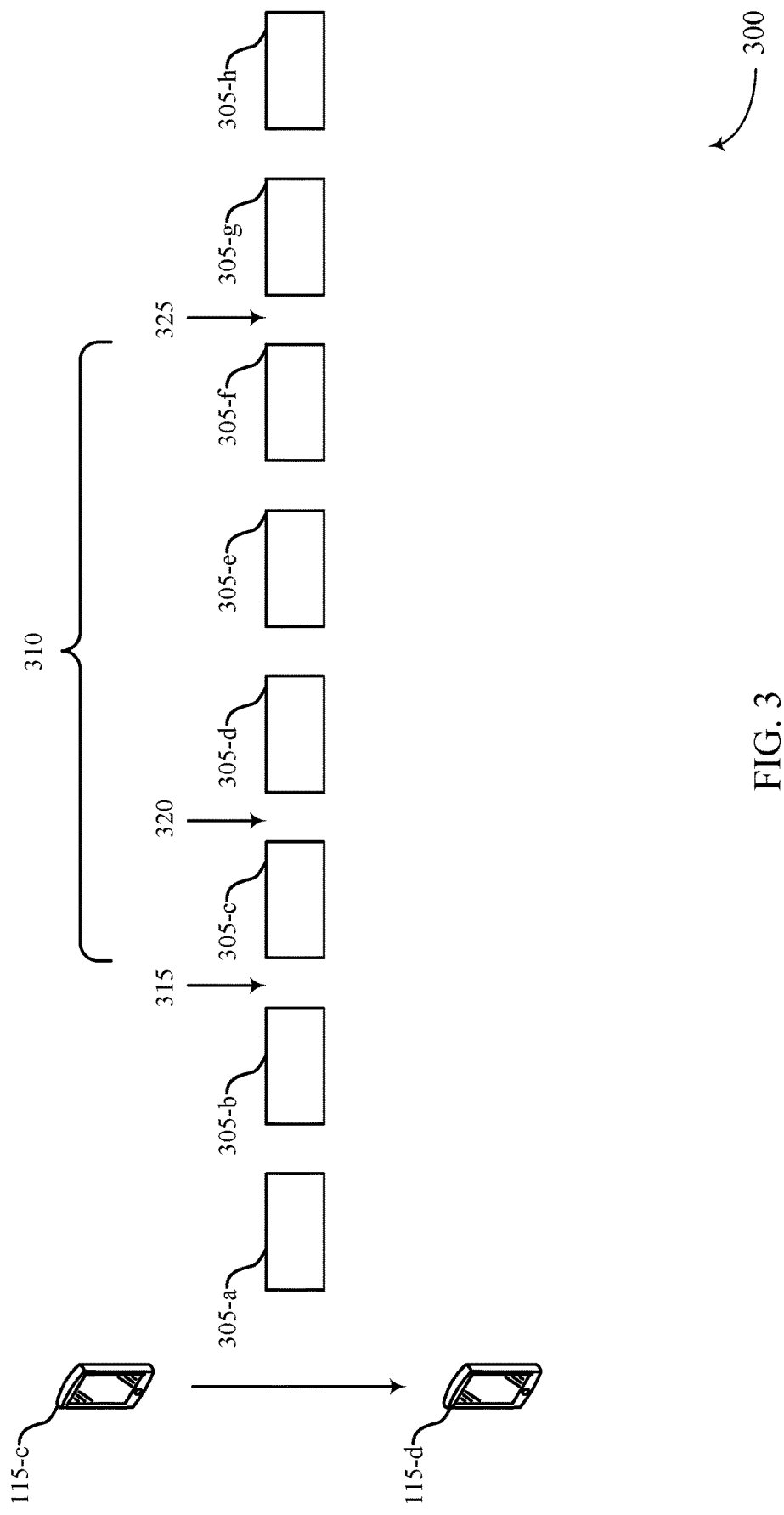
FIG. 3 illustrates an example of a transmission scheme that supports techniques for reference signal bundling in sidelink channels in accordance with aspects of the present disclosure.

FIG. 3 illustrates an example of a transmission scheme 300 that supports techniques for reference signal bundling in sidelink channels in accordance with aspects of the present disclosure. The transmission scheme 300 may implement or be implemented by one or more aspects of the wireless communications system 100 and the wireless communications system 200. For example, the transmission scheme 300 may illustrate communications between a UE 115-*c* and a UE 115-*d*, which may be examples of corresponding devices described with reference to FIGS. 1 and 2. It should be noted that, while examples are discussed below, any number of devices and device types may be used to accomplish implementations described in the present disclosure. For example, the UE 115-c and the UE 115-d may correspond to vehicles within a V2X system.

The UE 115-c and the UE 115-d may perform sidelink communications (e.g., over PSSCH, PSCCH, PSFCH) in support of one or more communications operations, such as V2X communications, communications supporting URLLC, communications supporting HOT, and the like. For example, the UE 115-c may transmit multiple sidelink transmissions 305 to the UE 115-d. In some cases, the UE 115-c and the UE 115-d may perform joint channel estimation by utilizing phase continuity to perform DMRS bundling over multiple sidelink transmissions 305 (e.g., including PSSCH, PSCCH, or PSFCH transmissions) based on a set of reference signals (e.g., DMRS) included in the sidelink transmissions 305. In some cases, the UE 115-c may indicate, to the UE 115-d, a DMRS bundling window 310, where the UE 115-d may perform joint channel estimation within the DMRS bundling window 310. The DMRS bundling window 310 may include one or more sidelink transmissions 305. In some cases, the UE 115-c may indicate the DMRS bundling window 310 based on an existence of phase continuity corresponding to sidelink transmissions from the UE 115-c. Additionally or alternatively, the DMRS bundling window 310 may begin during an activation period within the DMRS bundling window 310.

The UE 115-c may perform a sidelink transmission 305-a and a sidelink transmission 305-b. In some examples, the UE 115-c may indicate a QCL relationship at a time 315 to the UE 115-d before the DMRS bundling window 310. In some examples, the UE 115-c may indicate a change in the QCL relationship at the time 315, which may prompt the UE 115-c and the UE 115-d to cease DMRS bundling and cancel the DMRS bundling window 310. In other cases, the UE 115-c and the UE 115-d may begin DMRS bundling in a sidelink transmission 305-c, which may be the first sidelink transmission 305 within the DMRS bundling window 310. The UE 115-c may perform DMRS bundling across sidelink transmissions 305 within the DMRS bundling window 310 (e.g., sidelink transmission 305-c through 305-f) to enable the UE 115-d to perform a joint channel estimation. Following the DMRS bundling window 310, the UE 115-c may indicate a second QCL relationship to the UE 115-d at a time 325. In some cases, the UE 115-d may cease DMRS bundling based on the second QCL relationship, as described with reference to FIG. 2. Specifically, the QCL relationship indicated at the time 315, the second QCL relationship indicated at the time 325, or both, may prompt the UE 115-c and the UE 115-d to load or otherwise acquire new channel profile information. Based on the indication at the time 325, the UE 115-c may transmit sidelink transmissions 305-g and 305-h to the UE 115-d, where the sidelink transmissions 305-g and 305-h may not be associated with the DMRS bundling window 310, as illustrated in FIG. 3.

In some cases, it may be beneficial to cancel DMRS bundling due to changes in one or more factors (e.g., channel conditions, loss of phase continuity). In such cases, the DMRS bundling window 310 may be canceled within the activation period. For example, the UE 115-c may use RRC signaling, a MAC-CE, or both, to indicate a cancellation of DMRS bundling over different channels at a time 320. In some examples, a phase coherency identifier, a phase continuity identifier, or both, associated with DMRS transmitted from the UE 115-c may indicate a cancellation of DMRS bundling. For example, the UE 115-d may receive an RRC message (e.g., over a PC5 interface) from the UE 115-c, which may include a phase coherency identifier. The UE 115-d may cancel the joint channel estimation for the DMRS bundling window 310 based on the RRC message.

In some cases, DMRS bundling may be canceled based on one or more requests. For example, the UE 115-d may transmit to the UE 115-c a request to cancel DMRS bundling of PSCCH or PSSCH if the UE 115-d is not able to leverage the DMRS bundling. The request may be included in a PSFCH transmission (e.g., as feedback to a sidelink transmission 305 (e.g., a PSSCH) within the DMRS bundling window 310) or if an SCI message indicates the DMRS bundling, the UE 115-d may indicate that the UE 115-d is not capable of leveraging DMRS bundling. In some examples, the request may be transmitted in a MAC-CE, RRC signaling, or both. In some examples, the request may reduce complexity at the UE 115-c for maintaining phase continuity or coherency. Additionally or alternatively, the request may reduce complexity at the UE 115-c by enabling the UE 115-c to deactivate a power amplifier.

In some examples, the UE 115-c may indicate the cancellation (e.g., at the time 320) using one or more coherency process identifiers corresponding to the sidelink transmissions 305. The UE 115-c and the UE 115-d may cancel DMRS bundling, and the associated joint channel estimation, based on the coherency process identifiers.

In some examples, the UE 115-c may request that the UE 115-d cancel PSFCH DMRS bundling. The indication may be in SCI (e.g., SCI-2), since the UE 115-c, which may be receiving the PSFCH, may not perform PSFCH bundling, and therefore may not be maintaining phase coherency. The cancellation request (e.g., at the time 320) may be indicated via RRC signaling, a MAC-CE, or both.

Figure 4:
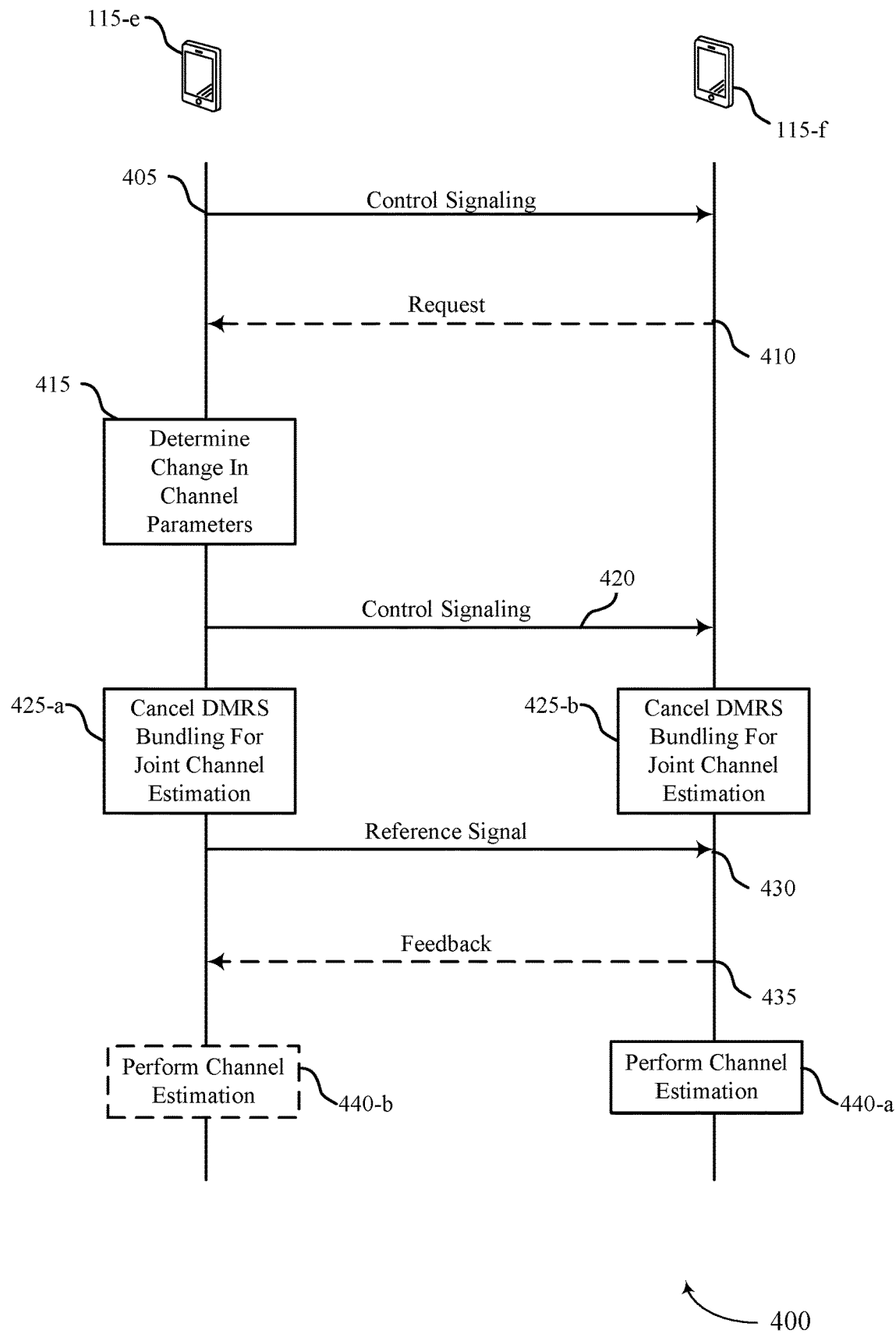
FIG. 4 illustrates an example of a process flow that supports techniques for reference signal bundling in sidelink channels in accordance with aspects of the present disclosure.

FIG. 4 illustrates an example of a process flow 400 that supports techniques for reference signal bundling in sidelink channels in accordance with aspects of the present disclosure. The process flow 400 may be implemented by one or more aspects of the wireless communications system 100 and the wireless communications system 200. For example, the process flow 400 may correspond to communications between a UE 115-e and a UE 115-f, which may be examples of corresponding devices described with reference to FIGS. 1 and 2. It should be noted that, while examples are discussed below, any number of devices and device types may be used to accomplish implementations described in the present disclosure. In the following description of the process flow 400, operations between the UE 115-e and the UE 115-f may occur in a different order or at different times than as shown. In some cases, the UE 115-e and the UE 115-f may correspond to vehicles within a V2X system. Some operations may also be omitted from the process flow 400, and other operations may be added to the process flow 400.

At 405, the UE 115-e may transmit, to the UE 115-f, control signaling over a sidelink connection indicating the use of one or more reference signals in a set of reference signals to perform joint channel estimation. For example, the UE 115-e may indicate a DMRS bundling window to the UE 115-f. In some cases, the control signaling may be based on maintained phase continuity, phase coherency, or both, corresponding to sidelink communications at the UE 115-e.

In some examples, at 410, the UE 115-f may transmit, to the UE 115-e, a request to cancel the DMRS bundling. For example, the UE 115-f may be unable to support DMRS bundling and may subsequently request the cancellation of the DMRS bundling and the DMRS bundling window.

At 415, the UE 115-e may determine a change in channel parameters, for example based on the request from the UE 115-*f*. In some examples, the UE 115-*e* may detect a loss in phase continuity. Additionally or alternatively, the UE 115-*e* may detect a change in channel parameters at the UE 115-*e*. Additionally or alternatively, the Based on the determination of a change in channel parameters, the UE 115-*e* may determine to cancel DMRS bundling and the DMRS bundling window.

At 420, the UE 115-*e* may transmit control signaling to the UE 115-*f* indicating the cancellation of DMRS bundling. In some cases, such as those described above with reference to FIGS. 2 and 3, the control signaling may explicitly or implicitly indicate the cancellation of DMRS bundling and the DMRS bundling window.

At 425-*a*, the UE 115-*e* may cancel DMRS bundling for joint channel estimation based on determining a change in channel parameters at 415 or, additionally or alternatively, based on the request at 410. In some examples, the UE 115-*e* may deactivate a power amplifier, which may otherwise be utilized to maintain phase coherency, phase continuity, or both. At 425-*b*, the UE 115-*f* may determine to cancel DMRS bundling for joint channel estimation based on the control signaling at 420.

At 430, the UE 115-*e* may transmit one or more reference signals (e.g., DMRS) using transmission parameters based on the cancellation of DMRS bundling for joint channel estimation at 425-*a* and 425-*b*. In some examples, at 435, the UE 115-*f* may transmit feedback (e.g., in a PSFCH) to the UE 115-*e* based on the reference signals. In some examples, the UE 115-*f* may transmit the feedback using transmission parameters based on the cancellation of DMRS bundling for joint channel estimation at 425-*a* and 425-*b*.

At 440-*a*, the UE 115-*f* may perform channel estimation based on the reference signals received from the UE 115-*e*. In some examples, at 440-*b*, the UE 115-*e* may perform channel estimation based on the feedback received from the UE 115-*f*. The operations performed at the UEs 115 may support improvements to sidelink channel estimation and, in some examples, may promote improvements to communications efficiency, among other benefits.

Figure 5:
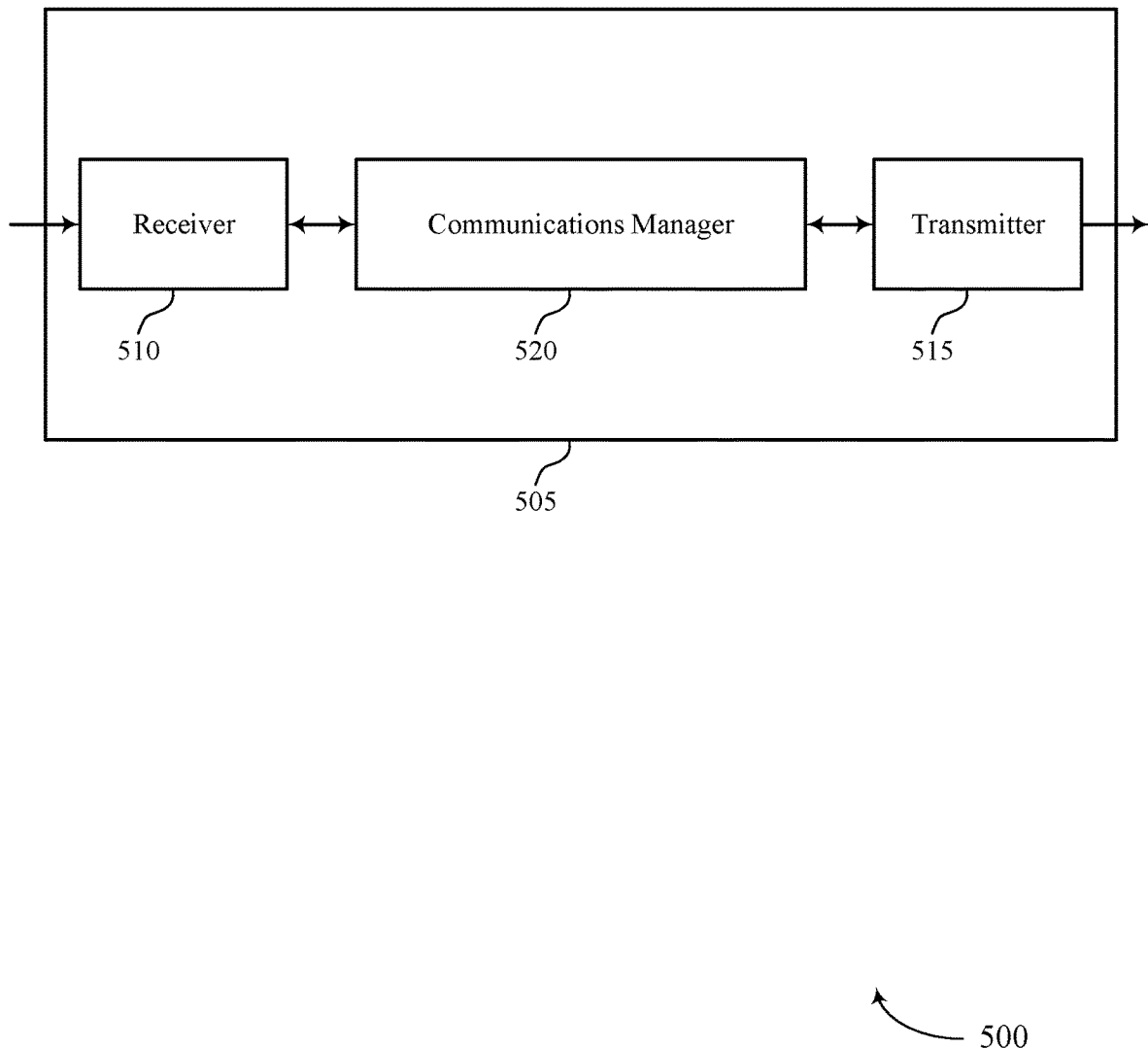
FIGS. 5 and 6 show block diagrams of devices that support techniques for reference signal bundling in sidelink channels in accordance with aspects of the present disclosure.

FIG. 5 shows a block diagram 500 of a device 505 that supports techniques for reference signal bundling in sidelink channels in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for reference signal bundling in sidelink channels). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for reference signal bundling in sidelink channels). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for reference signal bundling in sidelink channels as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for transmitting, to a second UE, first control signaling indicating a joint channel estimation procedure for a sidelink connection based on a set of reference signals from the second UE. The communications manager 520 may be configured as or otherwise support a means for determining a change in one or more channel parameters of the sidelink connection after the first control signaling is transmitted. The communications manager 520 may be configured as or otherwise support a means for transmitting, to the second UE, second control signaling indicating a cancellation of the joint channel estimation procedure for the sidelink connection based on determining the change in the one or more channel parameters. The communications manager 520 may be configured as or otherwise support a means for transmitting one or more reference signals of the set of reference signals based on receiving the second control signaling, at least one reference signal associated with a channel estimation procedure for the sidelink connection.

Additionally or alternatively, the communications manager 520 may support wireless communication at a first UE in accordance with examples as disclosed herein. For example, the communications manager 520 may be configured as or otherwise support a means for receiving, from a second UE, first control signaling indicating a joint channel estimation procedure for a sidelink connection based on a set of reference signals from the second UE. The communications manager 520 may be configured as or otherwise support a means for receiving, from the second UE, second control signaling indicating a cancellation of the joint channel estimation procedure for the sidelink connection based on a change in one or more channel parameters. The communications manager 520 may be configured as or otherwise support a means for monitoring for one or more reference signals of the set of reference signals based on transmitting the second control signaling. The communications manager 520 may be configured as or otherwise support a means for performing a channel estimation procedure for the sidelink connection using at least one reference signal received based on monitoring for the one or more reference signals.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing processing and power consumption at the UE by minimizing occurrences of inaccurate channel estimation by canceling DMRS bundling when one or more channel parameters (e.g., phase continuity, QCL) changes.

Figure 6:
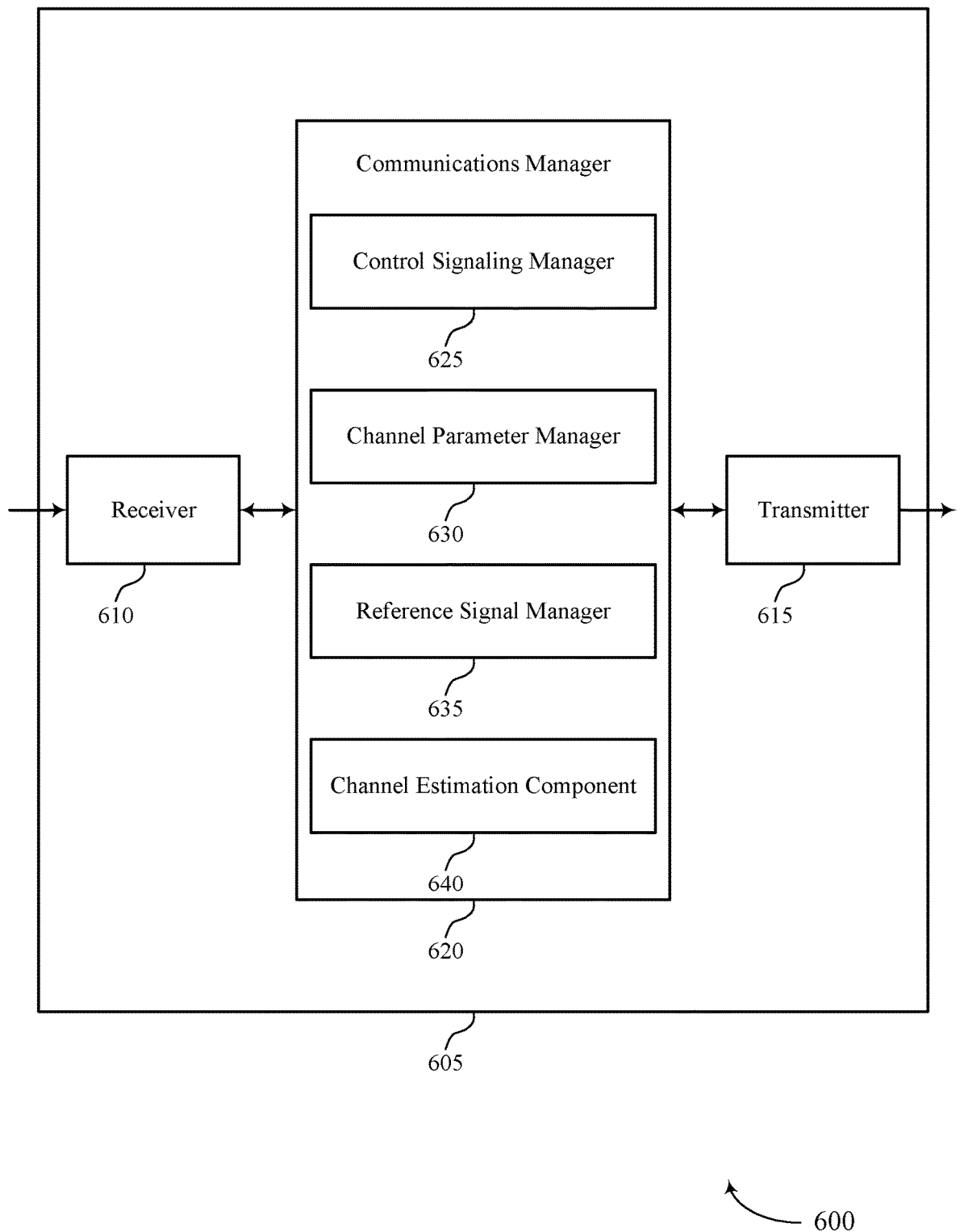

FIG. 6 shows a block diagram 600 of a device 605 that supports techniques for reference signal bundling in sidelink channels in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for reference signal bundling in sidelink channels). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for reference signal bundling in sidelink channels). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for reference signal bundling in sidelink channels as described herein. For example, the communications manager 620 may include a control signaling manager 625, a channel parameter manager 630, a reference signal manager 635, a channel estimation component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The control signaling manager 625 may be configured as or otherwise support a means for transmitting, to a second UE, first control signaling indicating a joint channel estimation procedure for a sidelink connection based on a set of reference signals from the second UE. The channel parameter manager 630 may be configured as or otherwise support a means for determining a change in one or more channel parameters of the sidelink connection after the first control signaling is transmitted. The control signaling manager 625 may be configured as or otherwise support a means for transmitting, to the second UE, second control signaling indicating a cancellation of the joint channel estimation procedure for the sidelink connection based on determining the change in the one or more channel parameters. The reference signal manager 635 may be configured as or otherwise support a means for transmitting one or more reference signals of the set of reference signals based on receiving the second control signaling, at least one reference signal associated with a channel estimation procedure for the sidelink connection.

Additionally or alternatively, the communications manager 620 may support wireless communication at a first UE in accordance with examples as disclosed herein. The control signaling manager 625 may be configured as or otherwise support a means for receiving, from a second UE, first control signaling indicating a joint channel estimation procedure for a sidelink connection based on a set of reference signals from the second UE. The control signaling manager 625 may be configured as or otherwise support a means for receiving, from the second UE, second control signaling indicating a cancellation of the joint channel estimation procedure for the sidelink connection based on a change in one or more channel parameters. The reference signal manager 635 may be configured as or otherwise support a means for monitoring for one or more reference signals of the set of reference signals based on transmitting the second control signaling. The channel estimation component 640 may be configured as or otherwise support a means for performing a channel estimation procedure for the sidelink connection using at least one reference signal received based on monitoring for the one or more reference signals.

Figure 7:
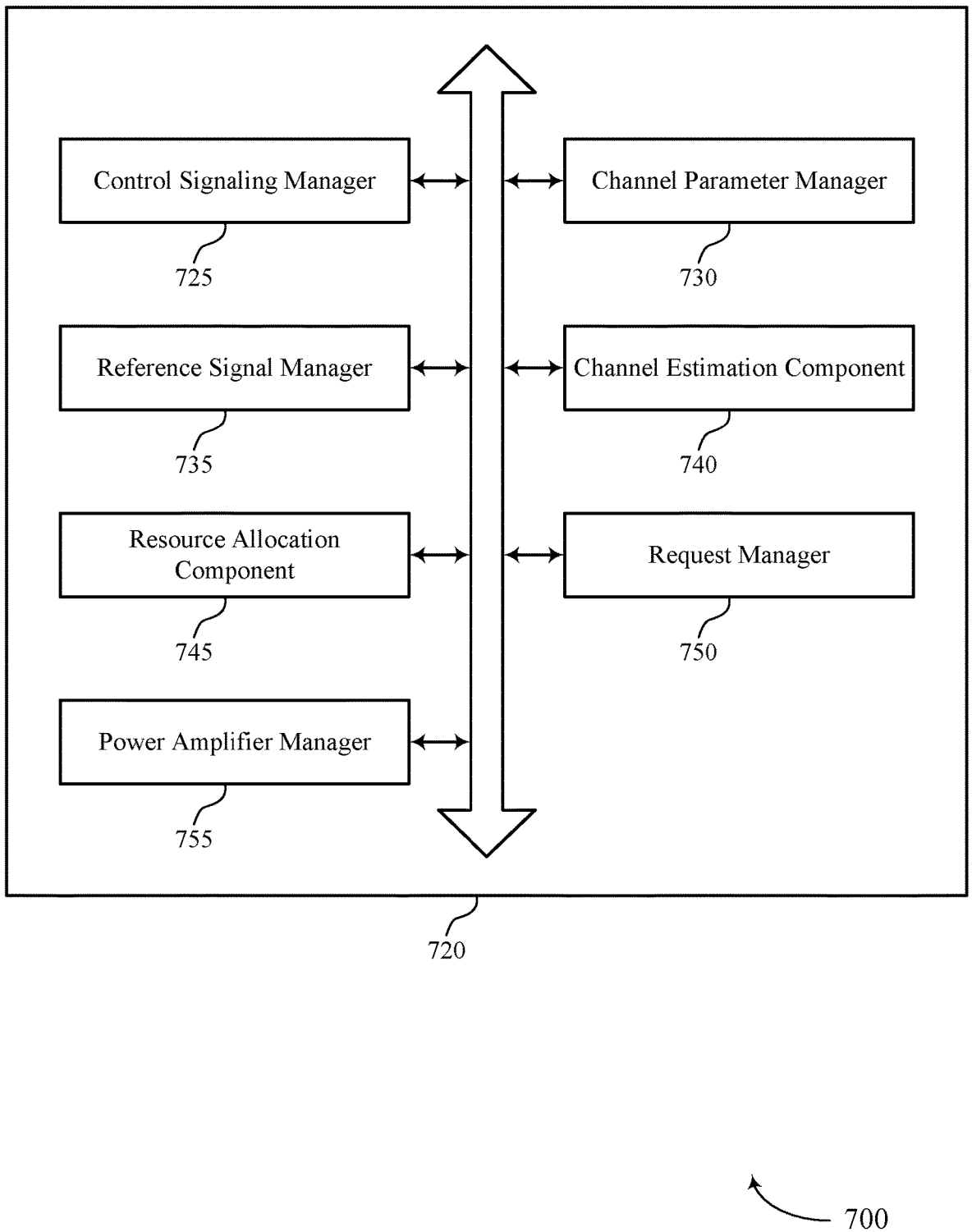
FIG. 7 shows a block diagram of a communications manager that supports techniques for reference signal bundling in sidelink channels in accordance with aspects of the present disclosure.

FIG. 7 shows a block diagram 700 of a communications manager 720 that supports techniques for reference signal bundling in sidelink channels in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for reference signal bundling in sidelink channels as described herein. For example, the communications manager 720 may include a control signaling manager 725, a channel parameter manager 730, a reference signal manager 735, a channel estimation component 740, a resource allocation component 745, a request manager 750, a power amplifier manager 755, or any combination thereof. Each of these components may communicate, directly or indirectly, with one another (e.g., via one or more buses).

The communications manager 720 may support wireless communication at a first UE in accordance with examples as disclosed herein. The control signaling manager 725 may be configured as or otherwise support a means for transmitting, to a second UE, first control signaling indicating a joint channel estimation procedure for a sidelink connection based on a set of reference signals from the second UE. The channel parameter manager 730 may be configured as or otherwise support a means for determining a change in one or more channel parameters of the sidelink connection after the first control signaling is transmitted. In some examples, the control signaling manager 725 may be configured as or otherwise support a means for transmitting, to the second UE, second control signaling indicating a cancellation of the joint channel estimation procedure for the sidelink connection based on determining the change in the one or more channel parameters. The reference signal manager 735 may be configured as or otherwise support a means for transmitting one or more reference signals of the set of reference signals based on receiving the second control signaling, at least one reference signal associated with a channel estimation procedure for the sidelink connection.

In some examples, to support transmitting the second control signaling, the resource allocation component 745 may be configured as or otherwise support a means for transmitting, in the second control signaling, an indication of a resource allocation associated with the set of reference signals, where the change in the one or more channel parameters includes the resource allocation, and where the cancellation of the joint channel estimation procedure for the sidelink connection is based on the resource allocation.

In some examples, to support transmitting the second control signaling, the resource allocation component 745 may be configured as or otherwise support a means for transmitting, in the second control signaling, an indication of one or more resource blocks allocated for a sidelink feedback channel, where the change in the one or more channel parameters includes the one or more resource blocks allocated for the sidelink feedback channel, and where the cancellation of the joint channel estimation procedure for the sidelink connection is based on the one or more resource blocks.

In some examples, a resource allocation associated with one or more reference signals of the set of reference signals is based on a mapping of the one or more resource blocks allocated for the sidelink feedback channel.

In some examples, to support transmitting the second control signaling, the control signaling manager 725 may be configured as or otherwise support a means for transmitting, in the second control signaling, an indication of a quasi-colocation relationship at the first UE, where the cancellation of the joint channel estimation procedure for the sidelink connection is based on the quasi-colocation parameter.

In some examples, the indication of the quasi-colocation relationship is a last indication of a set of indications of the quasi-colocation relationship.

In some examples, the quasi-colocation relationship is different from a previous quasi-colocation relationship. In some examples, the change in the one or more channel parameters includes a change from the previous quasi-colocation relationship to the quasi-colocation relationship.

In some examples, the change in the one or more channel parameters includes the quasi-colocation relationship.

In some examples, to support transmitting the second control signaling, the control signaling manager 725 may be configured as or otherwise support a means for transmitting, in the second control signaling, an indication of a transmission configuration indicator state for the first UE, where the cancellation of the joint channel estimation procedure for the sidelink connection is based on the transmission configuration indicator state.

In some examples, the indication of the transmission configuration indicator state is a last indication of a set of indications of the transmission configuration indicator state for the first UE.

In some examples, the transmission configuration indicator state is different from a previous transmission configuration indicator state. In some examples, the change in the one or more channel parameters includes a change from the previous transmission configuration indicator state to the transmission configuration indicator state.

In some examples, the change in the one or more channel parameters includes the transmission configuration indicator state.

In some examples, to support transmitting the second control signaling, the control signaling manager 725 may be configured as or otherwise support a means for transmitting, in the second control signaling, an indication of a phase coherency identifier, a continuity identifier, or both, associated with the set of reference signals, where the cancellation of the joint channel estimation procedure for the sidelink connection is based on the phase coherency identifier, the continuity identifier, or both.

In some examples, the request manager 750 may be configured as or otherwise support a means for receiving, from the second UE, signaling indicating a request to cancel the first joint channel estimation procedure, where the change in the one or more channel parameters is determined based on receiving the signaling.

In some examples, the request manager 750 may be configured as or otherwise support a means for identifying one or more coherency process identifiers in the signaling, each coherency process identifier associated with a respective reference signal of the set of reference signals. In some examples, the request manager 750 may be configured as or otherwise support a means for identifying the request to cancel the joint channel estimation procedure based on identifying the one or more coherency process identifiers.

In some examples, the power amplifier manager 755 may be configured as or otherwise support a means for deactivating a power amplifier at the first UE based on transmitting the second control signaling.

In some examples, to support transmitting the second control signaling, the control signaling manager 725 may be configured as or otherwise support a means for transmitting, in the second control signaling, an indication of one or more coherency process identifiers, each coherency process identifier associated with a respective reference signal of the set of reference signals, where the cancellation of the joint channel estimation procedure for the sidelink connection is based on the one or more coherency process identifiers.

In some examples, the first control signaling includes a first radio resource control message, a first medium access control control element, a first sidelink control information message, or any combination thereof. In some examples, the second control signaling includes a second radio resource control message, a second medium access control control element, a second sidelink control information message, or any combination thereof.

Additionally or alternatively, the communications manager 720 may support wireless communication at a first UE in accordance with examples as disclosed herein. In some examples, the control signaling manager 725 may be configured as or otherwise support a means for receiving, from a second UE, first control signaling indicating a joint channel estimation procedure for a sidelink connection based on a set of reference signals from the second UE. In some examples, the control signaling manager 725 may be configured as or otherwise support a means for receiving, from the second UE, second control signaling indicating a cancellation of the joint channel estimation procedure for the sidelink connection based on a change in one or more channel parameters. In some examples, the reference signal manager 735 may be configured as or otherwise support a means for monitoring for one or more reference signals of the set of reference signals based on transmitting the second control signaling. The channel estimation component 740 may be configured as or otherwise support a means for performing a channel estimation procedure for the sidelink connection using at least one reference signal received based on monitoring for the one or more reference signals.

In some examples, the resource allocation component 745 may be configured as or otherwise support a means for identifying, in the second control signaling, an indication of a resource allocation associated with the set of reference signals, where the change in the one or more channel parameters includes the resource allocation, and where the cancellation of the joint channel estimation procedure for the sidelink connection is indicated based on the resource allocation.

In some examples, the resource allocation component 745 may be configured as or otherwise support a means for identifying, in the second control signaling, an indication of one or more resource blocks allocated for a sidelink feedback channel, where the change in the one or more channel parameters includes the one or more resource blocks allocated for the sidelink feedback channel, and where the cancellation of the joint channel estimation procedure for the sidelink connection is indicated based on the one or more resource blocks.

In some examples, a resource allocation associated with one or more reference signals of the set of reference signals is based on a mapping of the one or more resource blocks allocated for the sidelink feedback channel.

In some examples, the control signaling manager 725 may be configured as or otherwise support a means for identifying, in the second control signaling, an indication of a quasi-colocation relationship at the second UE, where the cancellation of the joint channel estimation procedure for the sidelink connection is indicated based on the quasi-colocation parameter.

In some examples, the indication of the quasi-colocation relationship is a last indication of a set of indications of the quasi-colocation relationship.

In some examples, the quasi-colocation relationship is different from a previous quasi-colocation relationship. In some examples, the change in the one or more channel parameters includes a change from the previous quasi-colocation relationship to the quasi-colocation relationship.

In some examples, the change in the one or more channel parameters includes the quasi-colocation relationship.

In some examples, the control signaling manager 725 may be configured as or otherwise support a means for identifying, in the second control signaling, an indication of a transmission configuration indicator state for the second UE, where the cancellation of the joint channel estimation procedure for the sidelink connection is indicated based on the transmission configuration indicator state.

In some examples, the indication of the transmission configuration indicator state is a last indication of a set of indications of the transmission configuration indicator state for the second UE.

In some examples, the transmission configuration indicator state is different from a previous transmission configuration indicator state. In some examples, the change in the one or more channel parameters includes a change from the previous transmission configuration indicator state to the transmission configuration indicator state.

In some examples, the change in the one or more channel parameters includes the transmission configuration indicator state.

In some examples, the control signaling manager 725 may be configured as or otherwise support a means for identifying, in the second control signaling, an indication of a phase coherency identifier, a continuity identifier, or both, associated with the set of reference signals, where the cancellation of the joint channel estimation procedure for the sidelink connection is indicated based on the phase coherency identifier, the continuity identifier, or both.

In some examples, the request manager 750 may be configured as or otherwise support a means for transmitting, to the second UE, signaling indicating a request to cancel the first joint channel estimation procedure, where the change in the one or more channel parameters is based on transmitting the signaling.

In some examples, to support transmitting the signaling, the request manager 750 may be configured as or otherwise support a means for transmitting, in the signaling, one or more coherency process identifiers, each coherency process identifier associated with a respective reference signal of the set of reference signals, where the request to cancel the joint channel estimation procedure is indicated based on the one or more coherency process identifiers.

In some examples, the control signaling manager 725 may be configured as or otherwise support a means for identifying, in the second control signaling, an indication of one or more coherency process identifiers, each coherency process identifier associated with a respective reference signal of the set of reference signals, where the cancellation of the joint channel estimation procedure for the sidelink connection is indicated based on the one or more coherency process identifiers.

In some examples, the first control signaling includes a first radio resource control message, a first medium access control control element, a first sidelink control information message, or any combination thereof. In some examples, the second control signaling includes a second radio resource control message, a second medium access control control element, a second sidelink control information message, or any combination thereof.

Figure 8:
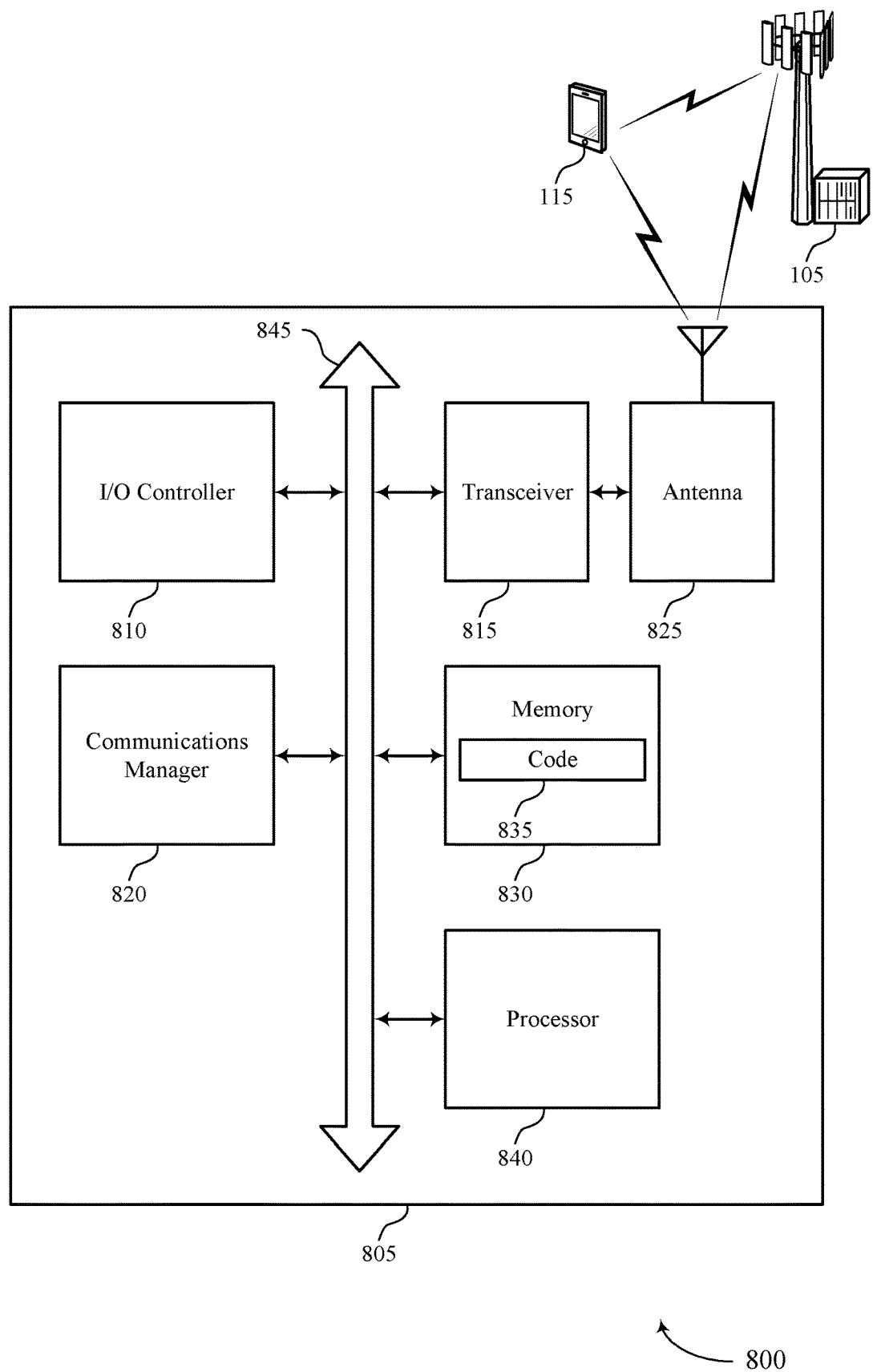
FIG. 8 shows a diagram of a system including a device that supports techniques for reference signal bundling in sidelink channels in accordance with aspects of the present disclosure.

FIG. 8 shows a diagram of a system 800 including a device 805 that supports techniques for reference signal bundling in sidelink channels in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for reference signal bundling in sidelink channels). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for transmitting, to a second UE, first control signaling indicating a joint channel estimation procedure for a sidelink connection based on a set of reference signals from the second UE. The communications manager 820 may be configured as or otherwise support a means for determining a change in one or more channel parameters of the sidelink connection after the first control signaling is transmitted. The communications manager 820 may be configured as or otherwise support a means for transmitting, to the second UE, second control signaling indicating a cancellation of the joint channel estimation procedure for the sidelink connection based on determining the change in the one or more channel parameters. The communications manager 820 may be configured as or otherwise support a means for transmitting one or more reference signals of the set of reference signals based on receiving the second control signaling, at least one reference signal associated with a channel estimation procedure for the sidelink connection.

Additionally or alternatively, the communications manager 820 may support wireless communication at a first UE in accordance with examples as disclosed herein. For example, the communications manager 820 may be configured as or otherwise support a means for receiving, from a second UE, first control signaling indicating a joint channel estimation procedure for a sidelink connection based on a set of reference signals from the second UE. The communications manager 820 may be configured as or otherwise support a means for receiving, from the second UE, second control signaling indicating a cancellation of the joint channel estimation procedure for the sidelink connection based on a change in one or more channel parameters. The communications manager 820 may be configured as or otherwise support a means for monitoring for one or more reference signals of the set of reference signals based on transmitting the second control signaling. The communications manager 820 may be configured as or otherwise support a means for performing a channel estimation procedure for the sidelink connection using at least one reference signal received based on monitoring for the one or more reference signals.

By including or configuring the communications manager 820 in accordance with examples as described herein, the device 805 may support techniques for improved communication reliability, reduced latency, reduced power consumption, and more efficient utilization of communication resources by cancelling DMRS bundling (e.g., DMRS bundling windows) based on implicit or explicit signaling. Specifically, the described techniques enable a UE to cancel DMRS bundling if one or more channel parameters changes such that joint channel estimation may be hindered or inaccurate. By cancelling DMRS bundling, the UE may avoid inaccurate channel estimation and additional signaling overhead by estimating one or more channels without using DMRS bundling.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for reference signal bundling in sidelink channels as described herein, or the processor 840 and the memory 830 may be otherwise configured to perform or support such operations.

Figure 9:
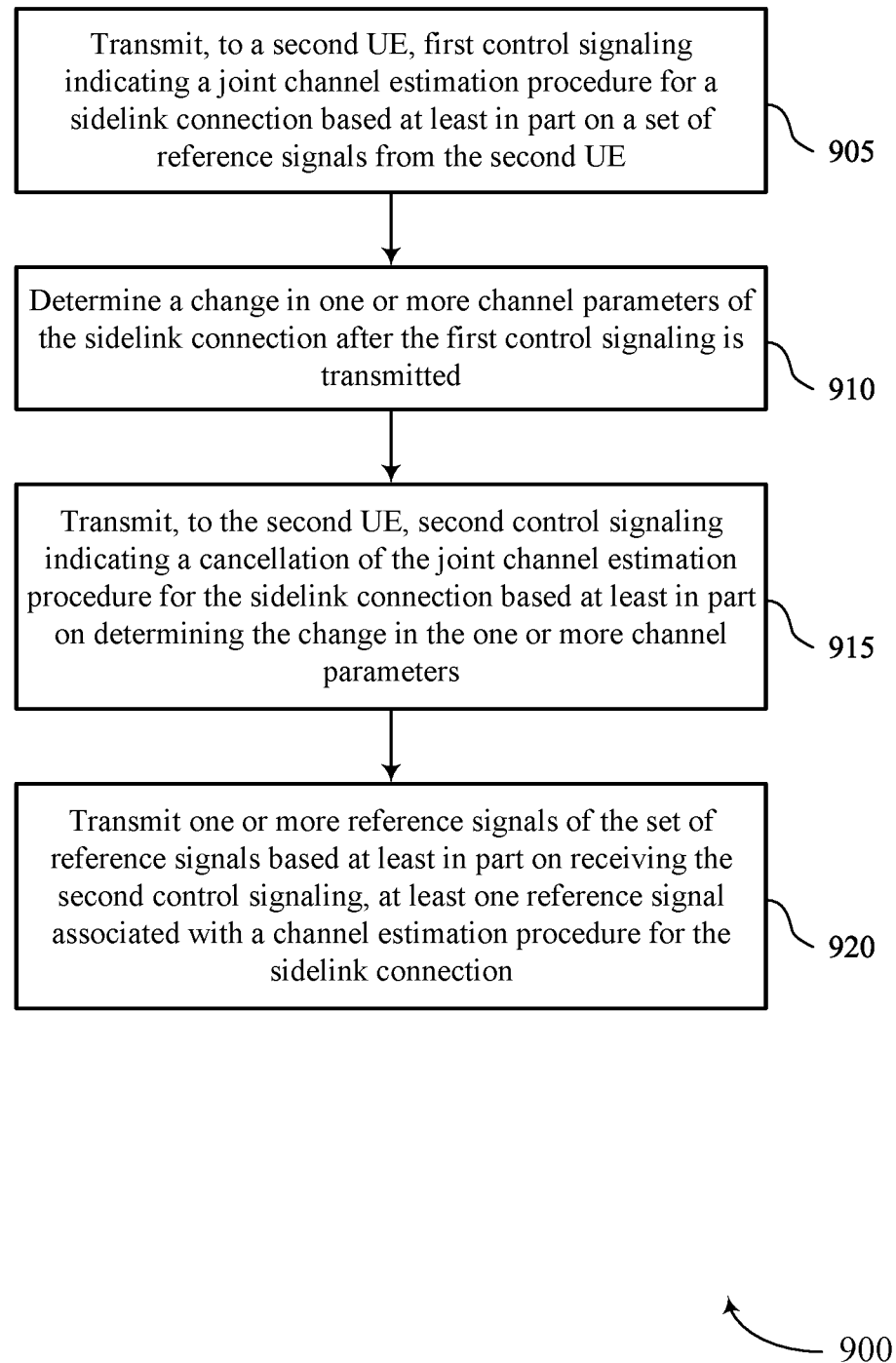
FIGS. 9 through 12 show flowcharts illustrating methods that support techniques for reference signal bundling in sidelink channels in accordance with aspects of the present disclosure.

FIG. 9 shows a flowchart illustrating a method 900 that supports techniques for reference signal bundling in sidelink channels in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include transmitting, to a second UE, first control signaling indicating a joint channel estimation procedure for a sidelink connection based on a set of reference signals from the second UE. The operations of 905 may be performed in accordance with examples as disclosed herein. In some examples, aspects of the operations of 905 may be performed by a control signaling manager 725 as described with reference to FIG. 7.

At 910, the method may include determining a change in one or more channel parameters of the sidelink connection after the first control signaling is transmitted. The operations of 910 may be performed in accordance with examples as disclosed herein. In some examples, aspects of the operations of 910 may be performed by a channel parameter manager 730 as described with reference to FIG. 7.

At 915, the method may include transmitting, to the second UE, second control signaling indicating a cancellation of the joint channel estimation procedure for the sidelink connection based on determining the change in the one or more channel parameters. The operations of 915 may be performed in accordance with examples as disclosed herein. In some examples, aspects of the operations of 915 may be performed by a control signaling manager 725 as described with reference to FIG. 7.

At 920, the method may include transmitting one or more reference signals of the set of reference signals based on receiving the second control signaling, at least one reference signal associated with a channel estimation procedure for the sidelink connection. The operations of 920 may be performed in accordance with examples as disclosed herein. In some examples, aspects of the operations of 920 may be performed by a reference signal manager 735 as described with reference to FIG. 7.

Figure 10:
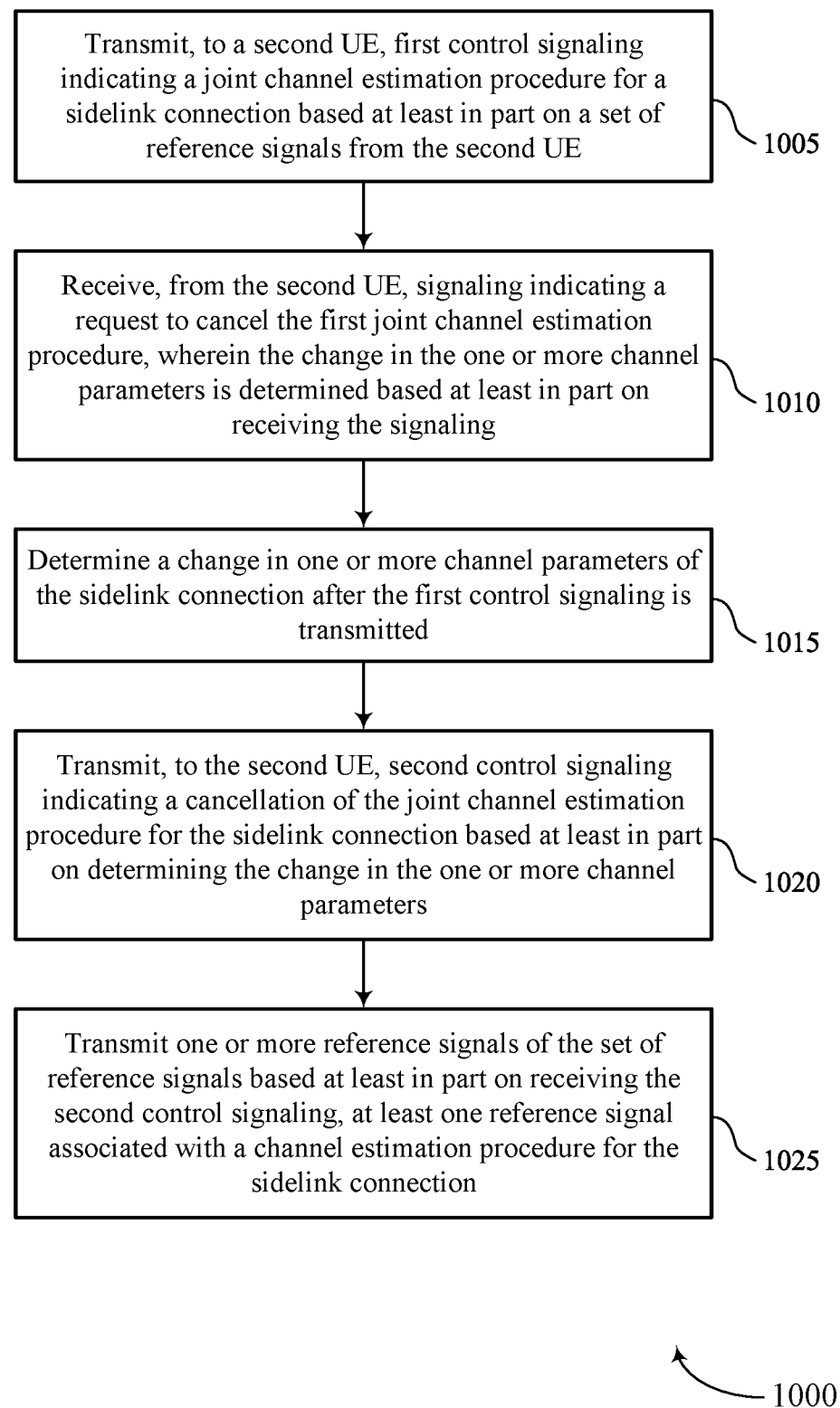

FIG. 10 shows a flowchart illustrating a method 1000 that supports techniques for reference signal bundling in sidelink channels in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include transmitting, to a second UE, first control signaling indicating a joint channel estimation procedure for a sidelink connection based on a set of reference signals from the second UE. The operations of 1005 may be performed in accordance with examples as disclosed herein. In some examples, aspects of the operations of 1005 may be performed by a control signaling manager 725 as described with reference to FIG. 7.

At 1010, the method may include receiving, from the second UE, signaling indicating a request to cancel the first joint channel estimation procedure, where the change in the one or more channel parameters is determined based on receiving the signaling. The operations of 1010 may be performed in accordance with examples as disclosed herein. In some examples, aspects of the operations of 1010 may be performed by a request manager 750 as described with reference to FIG. 7.

At 1015, the method may include determining a change in one or more channel parameters of the sidelink connection after the first control signaling is transmitted. The operations of 1015 may be performed in accordance with examples as disclosed herein. In some examples, aspects of the operations of 1015 may be performed by a channel parameter manager 730 as described with reference to FIG. 7.

At 1020, the method may include transmitting, to the second UE, second control signaling indicating a cancellation of the joint channel estimation procedure for the sidelink connection based on determining the change in the one or more channel parameters. The operations of 1020 may be performed in accordance with examples as disclosed herein. In some examples, aspects of the operations of 1020 may be performed by a control signaling manager 725 as described with reference to FIG. 7.

At 1025, the method may include transmitting one or more reference signals of the set of reference signals based on receiving the second control signaling, at least one reference signal associated with a channel estimation procedure for the sidelink connection. The operations of 1025 may be performed in accordance with examples as disclosed herein. In some examples, aspects of the operations of 1025 may be performed by a reference signal manager 735 as described with reference to FIG. 7.

Figure 11:
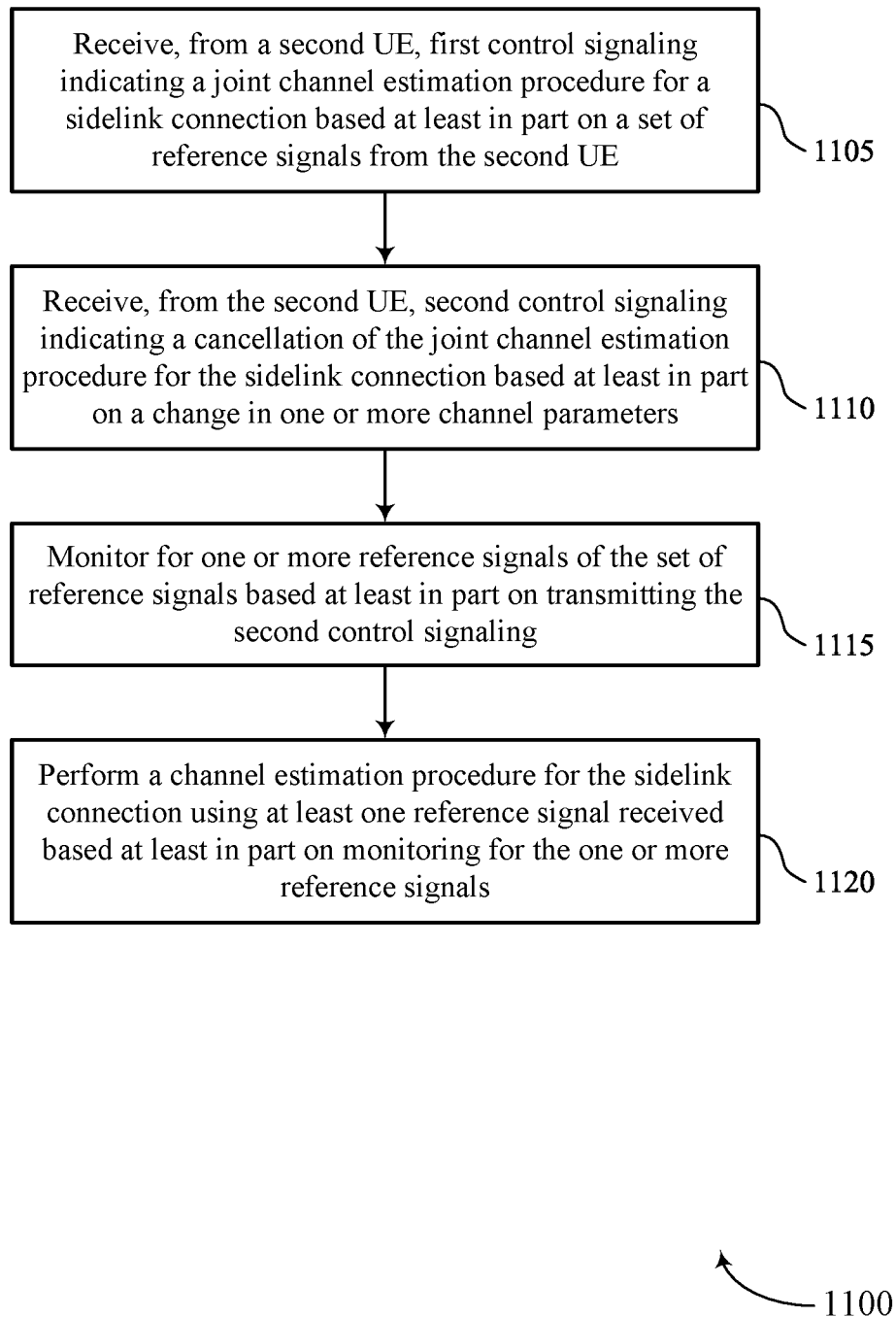

FIG. 11 shows a flowchart illustrating a method 1100 that supports techniques for reference signal bundling in sidelink channels in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a second UE, first control signaling indicating a joint channel estimation procedure for a sidelink connection based on a set of reference signals from the second UE. The operations of 1105 may be performed in accordance with examples as disclosed herein. In some examples, aspects of the operations of 1105 may be performed by a control signaling manager 725 as described with reference to FIG. 7.

At 1110, the method may include receiving, from the second UE, second control signaling indicating a cancellation of the joint channel estimation procedure for the sidelink connection based on a change in one or more channel parameters. The operations of 1110 may be performed in accordance with examples as disclosed herein. In some examples, aspects of the operations of 1110 may be performed by a control signaling manager 725 as described with reference to FIG. 7.

At 1115, the method may include monitoring for one or more reference signals of the set of reference signals based on transmitting the second control signaling. The operations of 1115 may be performed in accordance with examples as disclosed herein. In some examples, aspects of the operations of 1115 may be performed by a reference signal manager 735 as described with reference to FIG. 7.

At 1120, the method may include performing a channel estimation procedure for the sidelink connection using at least one reference signal received based on monitoring for the one or more reference signals. The operations of 1120 may be performed in accordance with examples as disclosed herein. In some examples, aspects of the operations of 1120 may be performed by a channel estimation component 740 as described with reference to FIG. 7.

Figure 12:
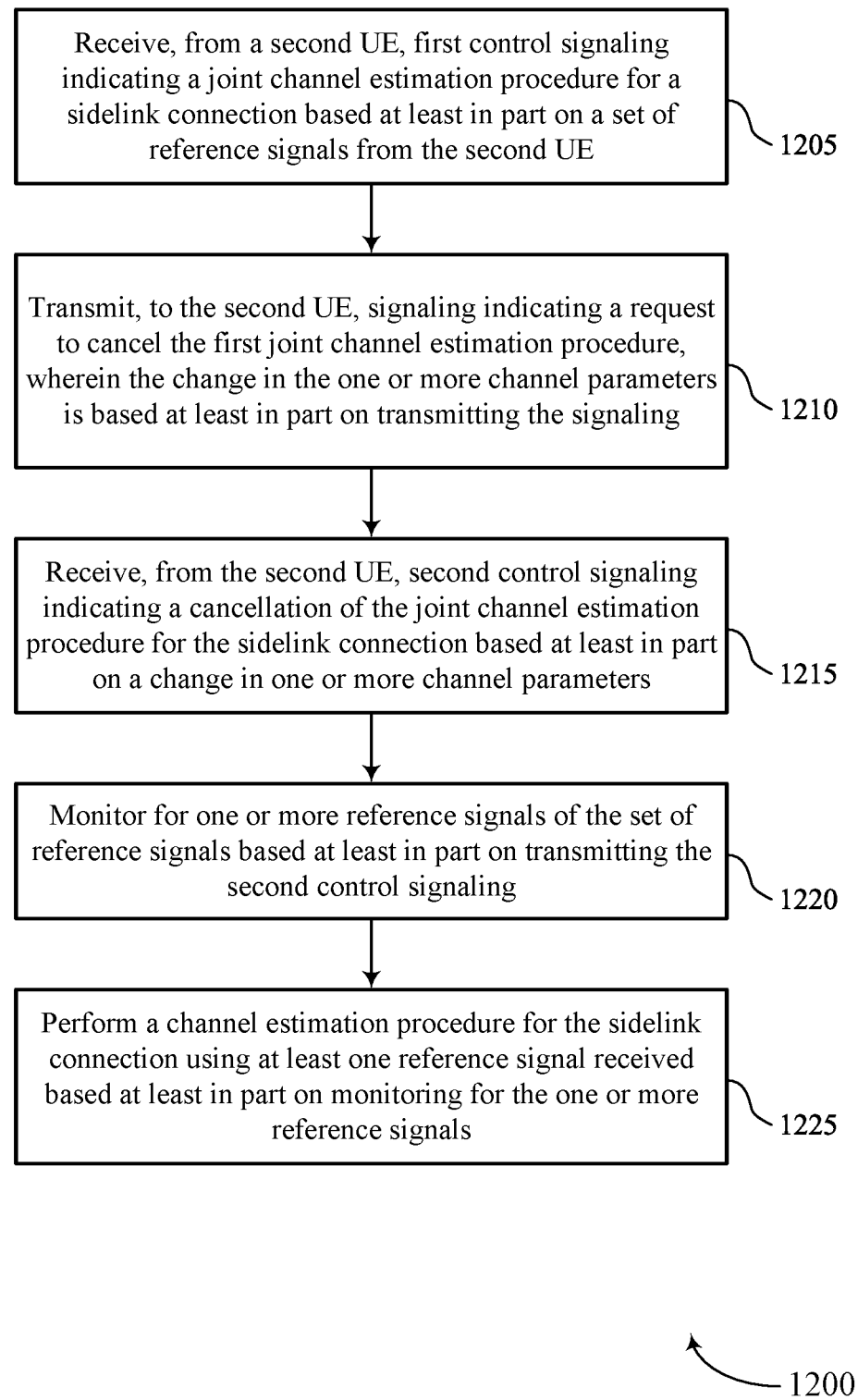

FIG. 12 shows a flowchart illustrating a method 1200 that supports techniques for reference signal bundling in sidelink channels in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, from a second UE, first control signaling indicating a joint channel estimation procedure for a sidelink connection based on a set of reference signals from the second UE. The operations of 1205 may be performed in accordance with examples as disclosed herein. In some examples, aspects of the operations of 1205 may be performed by a control signaling manager 725 as described with reference to FIG. 7.

At 1210, the method may include transmitting, to the second UE, signaling indicating a request to cancel the first joint channel estimation procedure, where the change in the one or more channel parameters is based on transmitting the signaling. The operations of 1210 may be performed in accordance with examples as disclosed herein. In some examples, aspects of the operations of 1210 may be performed by a request manager 750 as described with reference to FIG. 7.

At 1215, the method may include receiving, from the second UE, second control signaling indicating a cancellation of the joint channel estimation procedure for the sidelink connection based on a change in one or more channel parameters. The operations of 1215 may be performed in accordance with examples as disclosed herein. In some examples, aspects of the operations of 1215 may be performed by a control signaling manager 725 as described with reference to FIG. 7.

At 1220, the method may include monitoring for one or more reference signals of the set of reference signals based on transmitting the second control signaling. The operations of 1220 may be performed in accordance with examples as disclosed herein. In some examples, aspects of the operations of 1220 may be performed by a reference signal manager 735 as described with reference to FIG. 7.

At 1225, the method may include performing a channel estimation procedure for the sidelink connection using at least one reference signal received based on monitoring for the one or more reference signals. The operations of 1225 may be performed in accordance with examples as disclosed herein. In some examples, aspects of the operations of 1225 may be performed by a channel estimation component 740 as described with reference to FIG. 7.

The following provides an overview of aspects of the present disclosure:

Aspect 1: A method for wireless communication at a first UE, comprising: transmitting, to a second UE, first control signaling indicating a joint channel estimation procedure for a sidelink connection based at least in part on a set of reference signals from the second UE; determining a change in one or more channel parameters of the sidelink connection after the first control signaling is transmitted; transmitting, to the second UE, second control signaling indicating a cancellation of the joint channel estimation procedure for the sidelink connection based at least in part on determining the change in the one or more channel parameters; and transmitting one or more reference signals of the set of reference signals based at least in part on receiving the second control signaling, at least one reference signal associated with a channel estimation procedure for the sidelink connection.

Aspect 2: The method of aspect 1, wherein transmitting the second control signaling comprises: transmitting, in the second control signaling, an indication of a resource allocation associated with the set of reference signals, wherein the change in the one or more channel parameters comprises the resource allocation, and wherein the cancellation of the joint channel estimation procedure for the sidelink connection is based at least in part on the resource allocation.

Aspect 3: The method of any of aspects 1 through 2, wherein transmitting the second control signaling comprises: transmitting, in the second control signaling, an indication of one or more resource blocks allocated for a sidelink feedback channel, wherein the change in the one or more channel parameters comprises the one or more resource blocks allocated for the sidelink feedback channel, and wherein the cancellation of the joint channel estimation procedure for the sidelink connection is based at least in part on the one or more resource blocks.

Aspect 4: The method of aspect 3, wherein a resource allocation associated with one or more reference signals of the set of reference signals is based at least in part on a mapping of the one or more resource blocks allocated for the sidelink feedback channel.

Aspect 5: The method of any of aspects 1 through 4, wherein transmitting the second control signaling comprises: transmitting, in the second control signaling, an indication of a quasi-colocation relationship at the first UE, wherein the cancellation of the joint channel estimation procedure for the sidelink connection is based at least in part on the quasi-colocation parameter.

Aspect 6: The method of aspect 5, wherein the indication of the quasi-colocation relationship is a last indication of a set of indications of the quasi-colocation relationship.

Aspect 7: The method of any of aspects 5 through 6, wherein the quasi-colocation relationship is different from a previous quasi-colocation relationship, and the change in the one or more channel parameters comprises a change from the previous quasi-colocation relationship to the quasi-colocation relationship.

Aspect 8: The method of any of aspects 5 through 7, wherein the change in the one or more channel parameters comprises the quasi-colocation relationship.

Aspect 9: The method of any of aspects 1 through 8, wherein transmitting the second control signaling comprises: transmitting, in the second control signaling, an indication of a transmission configuration indicator state for the first UE, wherein the cancellation of the joint channel estimation procedure for the sidelink connection is based at least in part on the transmission configuration indicator state.

Aspect 10: The method of aspect 9, wherein the indication of the transmission configuration indicator state is a last indication of a set of indications of the transmission configuration indicator state for the first UE.

Aspect 11: The method of any of aspects 9 through 10, wherein the transmission configuration indicator state is different from a previous transmission configuration indicator state, and the change in the one or more channel parameters comprises a change from the previous transmission configuration indicator state to the transmission configuration indicator state.

Aspect 12: The method of any of aspects 9 through 11, wherein the change in the one or more channel parameters comprises the transmission configuration indicator state.

Aspect 13: The method of any of aspects 1 through 12, wherein transmitting the second control signaling comprises: transmitting, in the second control signaling, an indication of a phase coherency identifier, a continuity identifier, or both, associated with the set of reference signals, wherein the cancellation of the joint channel estimation procedure for the sidelink connection is based at least in part on the phase coherency identifier, the continuity identifier, or both.

Aspect 14: The method of any of aspects 1 through 13, further comprising: receiving, from the second UE, signaling indicating a request to cancel the first joint channel estimation procedure, wherein the change in the one or more channel parameters is determined based at least in part on receiving the signaling.

Aspect 15: The method of aspect 14, further comprising: identifying one or more coherency process identifiers in the signaling, each coherency process identifier associated with a respective reference signal of the set of reference signals; and identifying the request to cancel the joint channel estimation procedure based at least in part on identifying the one or more coherency process identifiers.

Aspect 16: The method of any of aspects 1 through 15, further comprising: deactivating a power amplifier at the first UE based at least in part on transmitting the second control signaling.

Aspect 17: The method of any of aspects 1 through 16, wherein transmitting the second control signaling comprises: transmitting, in the second control signaling, an indication of one or more coherency process identifiers, each coherency process identifier associated with a respective reference signal of the set of reference signals, wherein the cancellation of the joint channel estimation procedure for the sidelink connection is based at least in part on the one or more coherency process identifiers.

Aspect 18: The method of any of aspects 1 through 17, wherein the first control signaling comprises a first radio resource control message, a first medium access control control element, a first sidelink control information message, or any combination thereof; and the second control signaling comprises a second radio resource control message, a second medium access control control element, a second sidelink control information message, or any combination thereof.

Aspect 19: A method for wireless communication at a first UE, comprising: receiving, from a second UE, first control signaling indicating a joint channel estimation procedure for a sidelink connection based at least in part on a set of reference signals from the second UE; receiving, from the second UE, second control signaling indicating a cancellation of the joint channel estimation procedure for the sidelink connection based at least in part on a change in one or more channel parameters; monitoring for one or more reference signals of the set of reference signals based at least in part on transmitting the second control signaling; and performing a channel estimation procedure for the sidelink connection using at least one reference signal received based at least in part on monitoring for the one or more reference signals.

Aspect 20: The method of aspect 19, further comprising: identifying, in the second control signaling, an indication of a resource allocation associated with the set of reference signals, wherein the change in the one or more channel parameters comprises the resource allocation, and wherein the cancellation of the joint channel estimation procedure for the sidelink connection is indicated based at least in part on the resource allocation.

Aspect 21: The method of any of aspects 19 through 20, further comprising: identifying, in the second control signaling, an indication of one or more resource blocks allocated for a sidelink feedback channel, wherein the change in the one or more channel parameters comprises the one or more resource blocks allocated for the sidelink feedback channel, and wherein the cancellation of the joint channel estimation procedure for the sidelink connection is indicated based at least in part on the one or more resource blocks.

Aspect 22: The method of aspect 21, wherein a resource allocation associated with one or more reference signals of the set of reference signals is based at least in part on a mapping of the one or more resource blocks allocated for the sidelink feedback channel.

Aspect 23: The method of any of aspects 19 through 22, further comprising: identifying, in the second control signaling, an indication of a quasi-colocation relationship at the second UE, wherein the cancellation of the joint channel estimation procedure for the sidelink connection is indicated based at least in part on the quasi-colocation parameter.

Aspect 24: The method of aspect 23, wherein the indication of the quasi-colocation relationship is a last indication of a set of indications of the quasi-colocation relationship.

Aspect 25: The method of any of aspects 23 through 24, wherein the quasi-colocation relationship is different from a previous quasi-colocation relationship, and the change in the one or more channel parameters comprises a change from the previous quasi-colocation relationship to the quasi-colocation relationship.

Aspect 26: The method of any of aspects 23 through 25, wherein the change in the one or more channel parameters comprises the quasi-colocation relationship.

Aspect 27: The method of any of aspects 19 through 26, further comprising: identifying, in the second control signaling, an indication of a transmission configuration indicator state for the second UE, wherein the cancellation of the joint channel estimation procedure for the sidelink connection is indicated based at least in part on the transmission configuration indicator state.

Aspect 28: The method of aspect 27, wherein the indication of the transmission configuration indicator state is a last indication of a set of indications of the transmission configuration indicator state for the second UE.

Aspect 29: The method of any of aspects 27 through 28, wherein the transmission configuration indicator state is different from a previous transmission configuration indicator state, and the change in the one or more channel parameters comprises a change from the previous transmission configuration indicator state to the transmission configuration indicator state.

Aspect 30: The method of any of aspects 27 through 29, wherein the change in the one or more channel parameters comprises the transmission configuration indicator state.

Aspect 31: The method of any of aspects 19 through 30, further comprising: identifying, in the second control signaling, an indication of a phase coherency identifier, a continuity identifier, or both, associated with the set of reference signals, wherein the cancellation of the joint channel estimation procedure for the sidelink connection is indicated based at least in part on the phase coherency identifier, the continuity identifier, or both.

Aspect 32: The method of any of aspects 19 through 31, further comprising: transmitting, to the second UE, signaling indicating a request to cancel the first joint channel estimation procedure, wherein the change in the one or more channel parameters is based at least in part on transmitting the signaling.

Aspect 33: The method of aspect 32, wherein transmitting the signaling comprises: transmitting, in the signaling, one or more coherency process identifiers, each coherency process identifier associated with a respective reference signal of the set of reference signals, wherein the request to cancel the joint channel estimation procedure is indicated based at least in part on the one or more coherency process identifiers.

Aspect 34: The method of any of aspects 19 through 33, further comprising: identifying, in the second control signaling, an indication of one or more coherency process identifiers, each coherency process identifier associated with a respective reference signal of the set of reference signals, wherein the cancellation of the joint channel estimation procedure for the sidelink connection is indicated based at least in part on the one or more coherency process identifiers.

Aspect 35: The method of any of aspects 19 through 34, wherein the first control signaling comprises a first radio resource control message, a first medium access control control element, a first sidelink control information message, or any combination thereof; and the second control signaling comprises a second radio resource control message, a second medium access control control element, a second sidelink control information message, or any combination thereof.

Aspect 36: An apparatus for wireless communication at a first UE, comprising a processor; memory coupled with the processor; and instructions stored in the memory and executable by the processor to cause the apparatus to perform a method of any of aspects 1 through 18.

Aspect 37: An apparatus for wireless communication at a first UE, comprising at least one means for performing a method of any of aspects 1 through 18.

Aspect 38: A non-transitory computer-readable medium storing code for wireless communication at a first UE, the code comprising instructions executable by a processor to perform a method of any of aspects 1 through 18.

Aspect 39: An apparatus for wireless communication at a first UE, comprising a processor; memory coupled with the processor; and instructions stored in the memory and executable by the processor to cause the apparatus to perform a method of any of aspects 19 through 35.

Aspect 40: An apparatus for wireless communication at a first UE, comprising at least one means for performing a method of any of aspects 19 through 35.

Aspect 41: A non-transitory computer-readable medium storing code for wireless communication at a first UE, the code comprising instructions executable by a processor to perform a method of any of aspects 19 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
    transmitting, to a second UE, first control signaling indicating a joint channel estimation procedure for a sidelink connection based at least in part on a set of reference signals from the second UE;
    determining a change in one or more channel parameters of the sidelink connection after the first control signaling is transmitted;
    transmitting, to the second UE, second control signaling indicating a cancellation of the joint channel estimation procedure for the sidelink connection based at least in part on determining the change in the one or more channel parameters; and
    transmitting one or more reference signals of the set of reference signals based at least in part on receiving the second control signaling, at least one reference signal associated with a channel estimation procedure for the sidelink connection.

2. The method of claim 1, wherein transmitting the second control signaling comprises:
    transmitting, in the second control signaling, an indication of a resource allocation associated with the set of reference signals, wherein the change in the one or more channel parameters comprises the resource allocation, and wherein the cancellation of the joint channel estimation procedure for the sidelink connection is based at least in part on the resource allocation.

3. The method of claim 1, wherein transmitting the second control signaling comprises:
    transmitting, in the second control signaling, an indication of one or more resource blocks allocated for a sidelink feedback channel, wherein the change in the one or more channel parameters comprises the one or more resource blocks allocated for the sidelink feedback channel, and wherein the cancellation of the joint channel estimation procedure for the sidelink connection is based at least in part on the one or more resource blocks.

4. The method of claim 3, wherein a resource allocation associated with one or more reference signals of the set of reference signals is based at least in part on a mapping of the one or more resource blocks allocated for the sidelink feedback channel.

5. The method of claim 1, wherein transmitting the second control signaling comprises:
    transmitting, in the second control signaling, an indication of a quasi-colocation relationship at the first UE, wherein the cancellation of the joint channel estimation procedure for the sidelink connection is based at least in part on the quasi-colocation parameter.

6. The method of claim 5, wherein the indication of the quasi-colocation relationship is a last indication of a set of indications of the quasi-colocation relationship.

7. The method of claim 5, wherein:
the quasi-colocation relationship is different from a previous quasi-colocation relationship, and
the change in the one or more channel parameters comprises a change from the previous quasi-colocation relationship to the quasi-colocation relationship.

8. The method of claim 5, wherein the change in the one or more channel parameters comprises the quasi-colocation relationship.

9. The method of claim 1, wherein transmitting the second control signaling comprises:
transmitting, in the second control signaling, an indication of a transmission configuration indicator state for the first UE, wherein the cancellation of the joint channel estimation procedure for the sidelink connection is based at least in part on the transmission configuration indicator state.

10. The method of claim 9, wherein the indication of the transmission configuration indicator state is a last indication of a set of indications of the transmission configuration indicator state for the first UE.

11. The method of claim 9, wherein:
the transmission configuration indicator state is different from a previous transmission configuration indicator state, and
the change in the one or more channel parameters comprises a change from the previous transmission configuration indicator state to the transmission configuration indicator state.

12. The method of claim 9, wherein the change in the one or more channel parameters comprises the transmission configuration indicator state.

13. The method of claim 1, wherein transmitting the second control signaling comprises:
transmitting, in the second control signaling, an indication of a phase coherency identifier, a continuity identifier, or both, associated with the set of reference signals, wherein the cancellation of the joint channel estimation procedure for the sidelink connection is based at least in part on the phase coherency identifier, the continuity identifier, or both.

14. The method of claim 1, further comprising:
receiving, from the second UE, signaling indicating a request to cancel the first joint channel estimation procedure, wherein the change in the one or more channel parameters is determined based at least in part on receiving the signaling.

15. The method of claim 14, further comprising:
identifying one or more coherency process identifiers in the signaling, each coherency process identifier associated with a respective reference signal of the set of reference signals; and
identifying the request to cancel the joint channel estimation procedure based at least in part on identifying the one or more coherency process identifiers.

16. The method of claim 1, further comprising:
deactivating a power amplifier at the first UE based at least in part on transmitting the second control signaling.

17. The method of claim 1, wherein transmitting the second control signaling comprises:
transmitting, in the second control signaling, an indication of one or more coherency process identifiers, each coherency process identifier associated with a respective reference signal of the set of reference signals, wherein the cancellation of the joint channel estimation procedure for the sidelink connection is based at least in part on the one or more coherency process identifiers.

18. The method of claim 1, wherein:
the first control signaling comprises a first radio resource control message, a first medium access control control element, a first sidelink control information message, or any combination thereof; and
the second control signaling comprises a second radio resource control message, a second medium access control control element, a second sidelink control information message, or any combination thereof.

19. A method for wireless communication at a first user equipment (UE), comprising:
receiving, from a second UE, first control signaling indicating a joint channel estimation procedure for a sidelink connection based at least in part on a set of reference signals from the second UE;
receiving, from the second UE, second control signaling indicating a cancellation of the joint channel estimation procedure for the sidelink connection based at least in part on a change in one or more channel parameters;
monitoring for one or more reference signals of the set of reference signals based at least in part on transmitting the second control signaling; and
performing a channel estimation procedure for the sidelink connection using at least one reference signal received based at least in part on monitoring for the one or more reference signals.

20. The method of claim 19, further comprising:
identifying, in the second control signaling, an indication of a resource allocation associated with the set of reference signals, wherein the change in the one or more channel parameters comprises the resource allocation, and wherein the cancellation of the joint channel estimation procedure for the sidelink connection is indicated based at least in part on the resource allocation.

21. The method of claim 19, further comprising:
identifying, in the second control signaling, an indication of one or more resource blocks allocated for a sidelink feedback channel, wherein the change in the one or more channel parameters comprises the one or more resource blocks allocated for the sidelink feedback channel, and wherein the cancellation of the joint channel estimation procedure for the sidelink connection is indicated based at least in part on the one or more resource blocks.

22. The method of claim 21, wherein a resource allocation associated with one or more reference signals of the set of reference signals is based at least in part on a mapping of the one or more resource blocks allocated for the sidelink feedback channel.

23. The method of claim 19, further comprising:
identifying, in the second control signaling, an indication of a quasi-colocation relationship at the second UE, wherein the cancellation of the joint channel estimation procedure for the sidelink connection is indicated based at least in part on the quasi-colocation parameter.

24. The method of claim 19, further comprising:
identifying, in the second control signaling, an indication of a transmission configuration indicator state for the second UE, wherein the cancellation of the joint channel estimation procedure for the sidelink connection is indicated based at least in part on the transmission configuration indicator state.

25. The method of claim 19, further comprising:
identifying, in the second control signaling, an indication of a phase coherency identifier, a continuity identifier, or both, associated with the set of reference signals, wherein the cancellation of the joint channel estimation procedure for the sidelink connection is indicated based at least in part on the phase coherency identifier, the continuity identifier, or both.

26. The method of claim 19, further comprising:
transmitting, to the second UE, signaling indicating a request to cancel the first joint channel estimation procedure, wherein the change in the one or more channel parameters is based at least in part on transmitting the signaling.

27. The method of claim 26, wherein transmitting the signaling comprises:
transmitting, in the signaling, one or more coherency process identifiers, each coherency process identifier associated with a respective reference signal of the set of reference signals, wherein the request to cancel the joint channel estimation procedure is indicated based at least in part on the one or more coherency process identifiers.

28. The method of claim 19, further comprising:
identifying, in the second control signaling, an indication of one or more coherency process identifiers, each coherency process identifier associated with a respective reference signal of the set of reference signals, wherein the cancellation of the joint channel estimation procedure for the sidelink connection is indicated based at least in part on the one or more coherency process identifiers.

29. An apparatus for wireless communication at a first user equipment (UE), comprising:
a processor;
memory coupled with the processor; and
instructions stored in the memory and executable by the processor to cause the apparatus to:
transmit, to a second UE, first control signaling indicating a joint channel estimation procedure for a sidelink connection based at least in part on a set of reference signals from the second UE;
determine a change in one or more channel parameters of the sidelink connection after the first control signaling is transmitted;
transmit, to the second UE, second control signaling indicating a cancellation of the joint channel estimation procedure for the sidelink connection based at least in part on determining the change in the one or more channel parameters; and
transmit one or more reference signals of the set of reference signals based at least in part on receiving the second control signaling, at least one reference signal associated with a channel estimation procedure for the sidelink connection.

30. An apparatus for wireless communication at a first user equipment (UE), comprising:
a processor;
memory coupled with the processor; and
instructions stored in the memory and executable by the processor to cause the apparatus to:
receive, from a second UE, first control signaling indicating a joint channel estimation procedure for a sidelink connection based at least in part on a set of reference signals from the second UE;
receive, from the second UE, second control signaling indicating a cancellation of the joint channel estimation procedure for the sidelink connection based at least in part on a change in one or more channel parameters;
monitor for one or more reference signals of the set of reference signals based at least in part on transmitting the second control signaling; and
perform a channel estimation procedure for the sidelink connection using at least one reference signal received based at least in part on monitoring for the one or more reference signals.

\* \* \* \* \*